US009153199B2

(12) United States Patent
Tsukamoto et al.

(10) Patent No.: US 9,153,199 B2
(45) Date of Patent: Oct. 6, 2015

(54) MOBILE EQUIPMENT, INFORMATION DISPLAY SYSTEM AND RECORDING MEDIUM

(71) Applicant: NTT DOCOMO, INC., Chiyoda-ku (JP)

(72) Inventors: Masakatsu Tsukamoto, Tokyo (JP); Yasuo Morinaga, Tokyo (JP); Masashi Tagaya, Tokyo (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 14/363,125

(22) PCT Filed: Apr. 19, 2013

(86) PCT No.: PCT/JP2013/361631
§ 371 (c)(1),
(2) Date: Jun. 5, 2014

(87) PCT Pub. No.: WO2013/161705
PCT Pub. Date: Oct. 31, 2013

(65) Prior Publication Data
US 2014/0368411 A1    Dec. 18, 2014

(30) Foreign Application Priority Data

Apr. 25, 2012   (JP) .................................. 2012-100010

(51) Int. Cl.
*G09G 5/00* (2006.01)
*G06F 13/00* (2006.01)
(Continued)

(52) U.S. Cl.
CPC . *G09G 5/006* (2013.01); *G01S 3/04* (2013.01); *G06F 3/147* (2013.01); *G06F 13/00* (2013.01);
(Continued)

(58) Field of Classification Search
CPC .............. G09G 5/006; G09G 2370/16; G09G 2370/022; G09G 2356/00; G06F 3/147; H04B 5/0031; H04M 1/0266; H04M 1/0264; G01S 3/04

USPC ............................................ 345/1.1; 455/457
See application file for complete search history.

(56) References Cited

U.S. PATENT DOCUMENTS

| | | | |
|---|---|---|---|
| 2002/0046207 A1 | 4/2002 | Chino et al. | |
| 2009/0138921 A1 | 5/2009 | Miyata | |

(Continued)

FOREIGN PATENT DOCUMENTS

| | | |
|---|---|---|
| JP | 2002-82859 | 3/2002 |
| JP | 2003-22227 | 1/2003 |

(Continued)

OTHER PUBLICATIONS

Extended European Search Report issued May 27, 2015 in Patent Application No. 13781645.0.
(Continued)

*Primary Examiner* — Kumar Patel
*Assistant Examiner* — Vinh Lam
(74) *Attorney, Agent, or Firm* — Oblon, McClelland, Maier & Neustadt, L.L.P.

(57) ABSTRACT

A mobile equipment includes an alternative display searching part sending an alternative display list request including current position information indicating the current position of the mobile equipment to a server, receiving from the server an alternative display list representing a list of display devices located near the current position, and selecting an alternative destination display device from the alternative display list on the basis of an inter-device distance between each of the display device and the mobile equipment, an ME short-distance radio communication part sending a distance measuring signal request signal to the display devices by short-distance radio communication and estimating the inter-device distance on the basis of the field strength of a distance measuring signal sent from the display devices, and an ME network connection part sending event information of the mobile equipment to the alternative destination display device.

8 Claims, 20 Drawing Sheets

(51) Int. Cl.
*G01S 3/04* (2006.01)
*G06F 3/147* (2006.01)
*H04B 5/00* (2006.01)
*H04M 1/02* (2006.01)
*G06F 21/84* (2013.01)

(52) U.S. Cl.
CPC .............. *G06F 21/84* (2013.01); *H04B 5/0031* (2013.01); *H04M 1/0264* (2013.01); *H04M 1/0266* (2013.01); *G09G 2356/00* (2013.01); *G09G 2370/022* (2013.01); *G09G 2370/16* (2013.01); *G09G 2370/22* (2013.01)

(56) References Cited

U.S. PATENT DOCUMENTS

| | | |
|---|---|---|
| 2009/0141895 A1 | 6/2009 | Anderson et al. |
| 2009/0316951 A1* | 12/2009 | Soderstrom .................... 382/103 |
| 2012/0122443 A1 | 5/2012 | Nakahara |
| 2012/0221657 A1* | 8/2012 | Zeevi et al. .................... 709/206 |
| 2013/0057903 A1* | 3/2013 | Yamazaki .................... 358/1.15 |
| 2014/0013437 A1 | 1/2014 | Anderson et al. |

FOREIGN PATENT DOCUMENTS

| | | |
|---|---|---|
| JP | 2009-129194 | 6/2009 |
| WO | WO 2011/010642 A1 | 1/2011 |

OTHER PUBLICATIONS

Japanese Office Action issued Oct. 21, 2014, in Japan Patent Application No. 2012-100010 (with English translation).
International Search Report issued Jul. 30, 2013, in PCT/JP13/061631 filed Apr. 19, 2013.

* cited by examiner

FIG. 19

| ALTERNATIVE DISPLAY CANDIDATE NUMBER | DISPLAY DEVICE ID | NW ACCESS POINT (ESSID OR THE LIKE) | IP ADDRESS OF ALTERNATIVE DISPLAY | ALTERNATIVE DISPLAY INSTRUCTION TRANSMISSION TRIGGER DISTANCE |
|---|---|---|---|---|
| 1 | xxxxxxx | aaabbbcc | 192.168.1.11 | 3 m |
| 2 | oooooo | ddeeefff | 192.168.1.12 | 3 m |
| 3 | vvvvvv | gghhhiii | 192.168.1.13 | 5 m |
| 4 | wwww | jjkkklll | 192.168.1.14 | 1 m |
| ... | ... | ... | ... | ... |

FIG. 20

| EVENT TYPE | AREA TYPE | MOVE-MENT STATUS | DISPLAY DEVICE TYPE | DISPLAY SPECIFICS | | | |
|---|---|---|---|---|---|---|---|
| | | | | TEXT | IMAGE | DISPLAY DURA-TION | DISPLAY SIZE |
| UNREAD MAIL (1) | RESIDEN-TIAL AREA | STAND-STILL | SIGNAGE | UNREAD MAIL | XX.jpg | 10 SEC | X = 960 px Y = 640 px |
| UNREAD MAIL (1) | RESIDEN-TIAL AREA | STAND-STILL | PC | UNREAD MAIL | XX.jpg | 10 SEC | X = 480 px Y = 320 px |
| UNREAD MAIL (1) | RESIDEN-TIAL AREA | STAND-STILL | TV | UNREAD MAIL | XX.jpg | 10 SEC | X = 720 px Y = 480 px |
| UNREAD MAIL (1) | RESIDEN-TIAL AREA | WALK-ING | SIGNAGE | UNREAD MAIL | XX.jpg | 5 SEC | X = 960 px Y = 640 px |
| UNREAD MAIL (1) | RESIDEN-TIAL AREA | WALK-ING | PC | UNREAD MAIL | XX.jpg | 5 SEC | X = 480 px Y = 320 px |
| UNREAD MAIL (1) | RESIDEN-TIAL AREA | WALK-ING | TV | UNREAD MAIL | XX.jpg | 5 SEC | X = 720 px Y = 480 px |
| UNREAD MAIL (1) | RESIDEN-TIAL AREA | ON TRAIN | SIGNAGE | UNREAD MAIL | XX.jpg | 10 SEC | X = 960 px Y = 640 px |
| UNREAD MAIL (1) | RESIDEN-TIAL AREA | ON TRAIN | PC | UNREAD MAIL | XX.jpg | 10 SEC | X = 480 px Y = 320 px |
| UNREAD MAIL (1) | RESIDEN-TIAL AREA | ON TRAIN | TV | UNREAD MAIL | XX.jpg | 10 SEC | X = 720 px Y = 480 px |
| UNREAD MAIL (1) | COMMER-CIAL AREA | STAND-STILL | SIGNAGE | UNREAD MAIL | XX.jpg | 10 SEC | X = 960 px Y = 640 px |
| ... | ... | ... | ... | ... | ... | ... | ... |
| UNREAD MAIL (2+) | RESIDEN-TIAL AREA | STAND-STILL | SIGNAGE | N UNREAD MAIL | XX.jpg | 15 SEC | X = 960 px Y = 640 px |
| ... | ... | ... | ... | ... | ... | ... | ... |
| MISSED CALL (1) | RESIDEN-TIAL AREA | STAND-STILL | SIGNAGE | MISSED CALL | YY.jpg | 15 SEC | X = 960 px Y = 640 px |
| ... | ... | ... | ... | ... | ... | ... | ... |
| MISSED CALL (2+) | RESIDEN-TIAL AREA | STAND-STILL | SIGNAGE | N MISSED CALL | YY.jpg | 15 SEC | X = 960 px Y = 640 px |
| ... | ... | ... | ... | ... | ... | ... | ... |
| RECEIVING | RESIDEN-TIAL AREA | STAND-STILL | SIGNAGE | INCOMING MAIL | ZZ.jpg | 20 SEC | X = 960 px Y = 640 px |
| ... | ... | ... | ... | ... | ... | ... | ... |

MOBILE EQUIPMENT, INFORMATION DISPLAY SYSTEM AND RECORDING MEDIUM

TECHNICAL FIELD

The present invention relates to mobile equipment, an information display system, and a recording medium that display information concerning an event that has occurred on the mobile equipment on a display of a device that is different from the mobile equipment.

BACKGROUND ART

Techniques to transfer information sent to mobile equipment to a public display device installed in a public space and cause the public display device to display the transferred information have been disclosed. For example, the technique disclosed in Patent literature 1 aims to solve the problem that due to portability requirements, the display screen of a mobile device is not able to provide adequate resolution to allow a user to view various kinds of information on the display screen of the mobile device in a manner desired by the user. In Patent document 1, first a high-resolution public display is installed in a public space. The public display device is connected to a fast network. The public display device is capable of radio communication with mobile devices at short distances via infrared or the like. A mobile device acquires the network address of the public display device by radio communication and sends the network address to a gateway server along with the network address of the mobile device. The gateway server transfers information sent to the mobile device to the public display device.

PRIOR ART LITERATURE

Patent Literature

Patent literature 1: Japanese Patent Application Laid-Open No. 2003-22227

SUMMARY OF THE INVENTION

Problems to be Solved by the Invention

Many of the kinds of data displayed on a mobile device are user's private information. When the technique disclosed in Patent literature 1 is used to display data provided from the mobile device, it is difficult to distinguish between information to be displayed on the public display device and information that should not be displayed on the public display. For example, an example of implementation of a system similar to the technique disclosed in Patent literature 1 allows the user of a mobile device to select data to send to an external display or places restrictions on the type of information that can be displayed on an external display, thereby preventing information that should not be disclosed to others from being displayed.

However, it is troublesome for the user to have to determine whether to display information on an external display on a case-by-case basis. Furthermore, it is impossible for the system described above to make use of an external display as an alternative display to notify the user of the arrival of mail or to provide incoming call information to the user because the procedure of the system makes the user him/herself determine whether to permit display of information. An object of the present invention is to provide mobile equipment capable of causing another device to display information having optimized specifics without intervention of user's judgment.

Means to Solve the Problems

Mobile equipment of the present invention is configured to communicate with a server and a display device and includes an alternative display searching part, an ME short-distance radio communication part, an ME network connection part, an alternative display instruction determining part and an alternative display instruction sending part.

The alternative display searching part acquires current position information indicating the current position of the mobile equipment, sends an alternative display list request including the current position information to the server, receives from the server an alternative display list representing a list of display devices within a predetermined distance from the current position, and selects a display device serving as an alternative destination display, herein after referred to as an alternative destination display device, from among the display devices on the alternative display list on a basis of the inter-device distance between the mobile equipment and each of the display devices. The ME short-distance radio communication part sends a distance measuring signal request signal to the display devices by short-distance radio communication, receives a distance measuring signal sent from the display devices, measures the field strength of the distance measuring signal, and estimates the inter-device distance on the basis of the field strength. The ME network connection part establishes communication with the alternative destination display device and, when a predetermined event occurs on the mobile equipment, sends event information to the alternative destination display device to notify the alternative destination display device of the occurrence of the event. The alternative display instruction determining part acquires a parameter indicating the status of the mobile equipment, the status of the alternative destination display device, or the status of the event that occurred and determines display specifics of a display on the alternative destination display device on the basis of the parameter. The alternative display instruction sending part sends a display instruction including the display specifics to the alternative destination display device.

Effects of the Invention

The mobile equipment of the present invention is capable of causing another device to display information having optimized display specifics without intervention of user's judgment.

BRIEF DESCRIPTION OF THE DRAWINGS

FIG. 19 is a diagram illustrating an example of an alternative display list according to the first embodiment; and FIG. 20 is a diagram illustrating an example of a table stored in a judgment database according to the first embodiment.

DETAILED DESCRIPTION OF THE EMBODIMENTS

Figure 1:
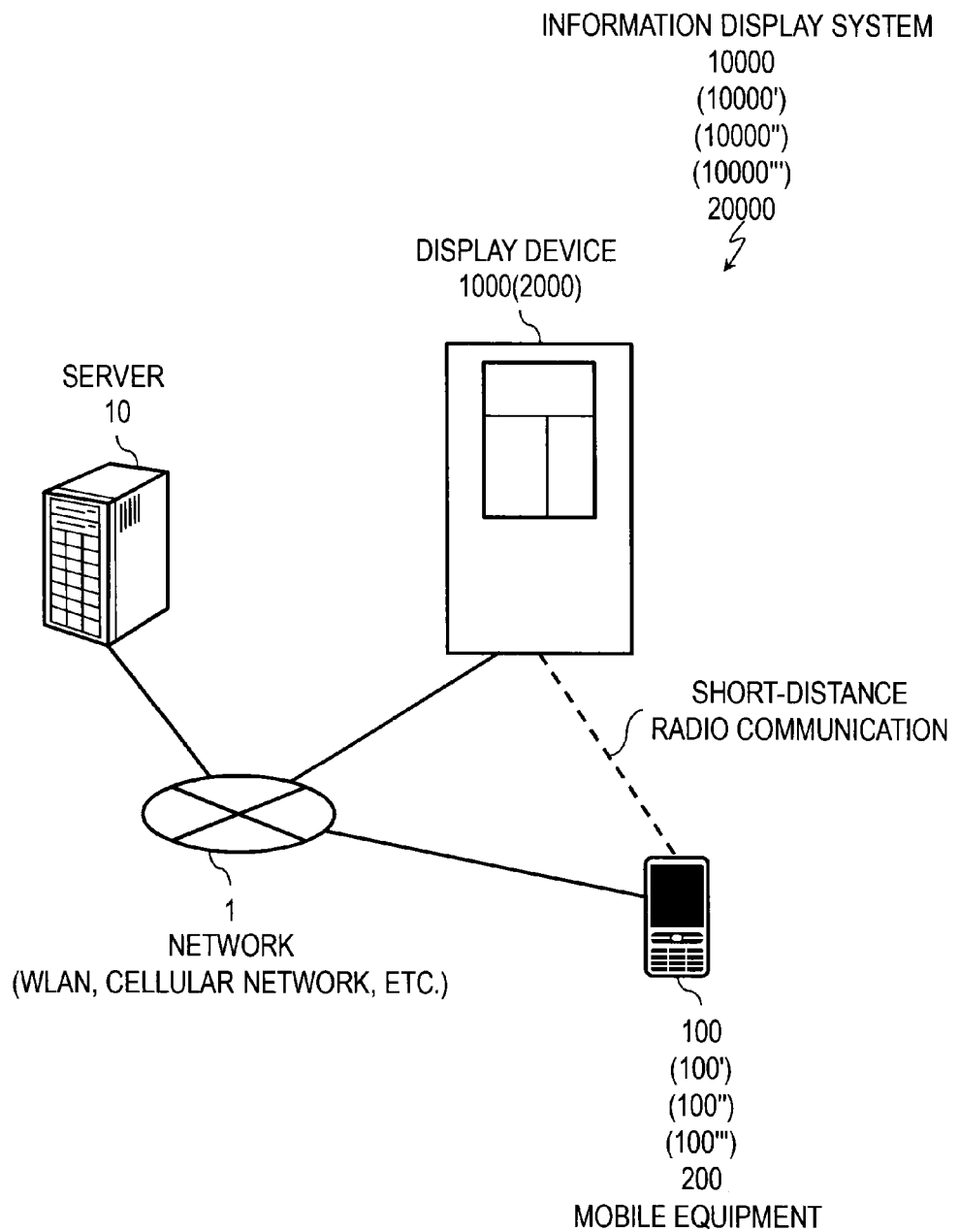
FIG. 1 is a diagram generally illustrating an information display system of the present invention.

Embodiments of the present invention will be described below in detail. Components that have the same functions are given the same reference numerals and repeated description thereof will be omitted.

Terms used herein will be described below.
<Mobile Equipment>

Any portable device that has communication capabilities is referred to as mobile equipment. The notion of mobile equipment encompasses mobile phones, PDAs, personal computers and the like.

Overview of the Invention

Figure 2:
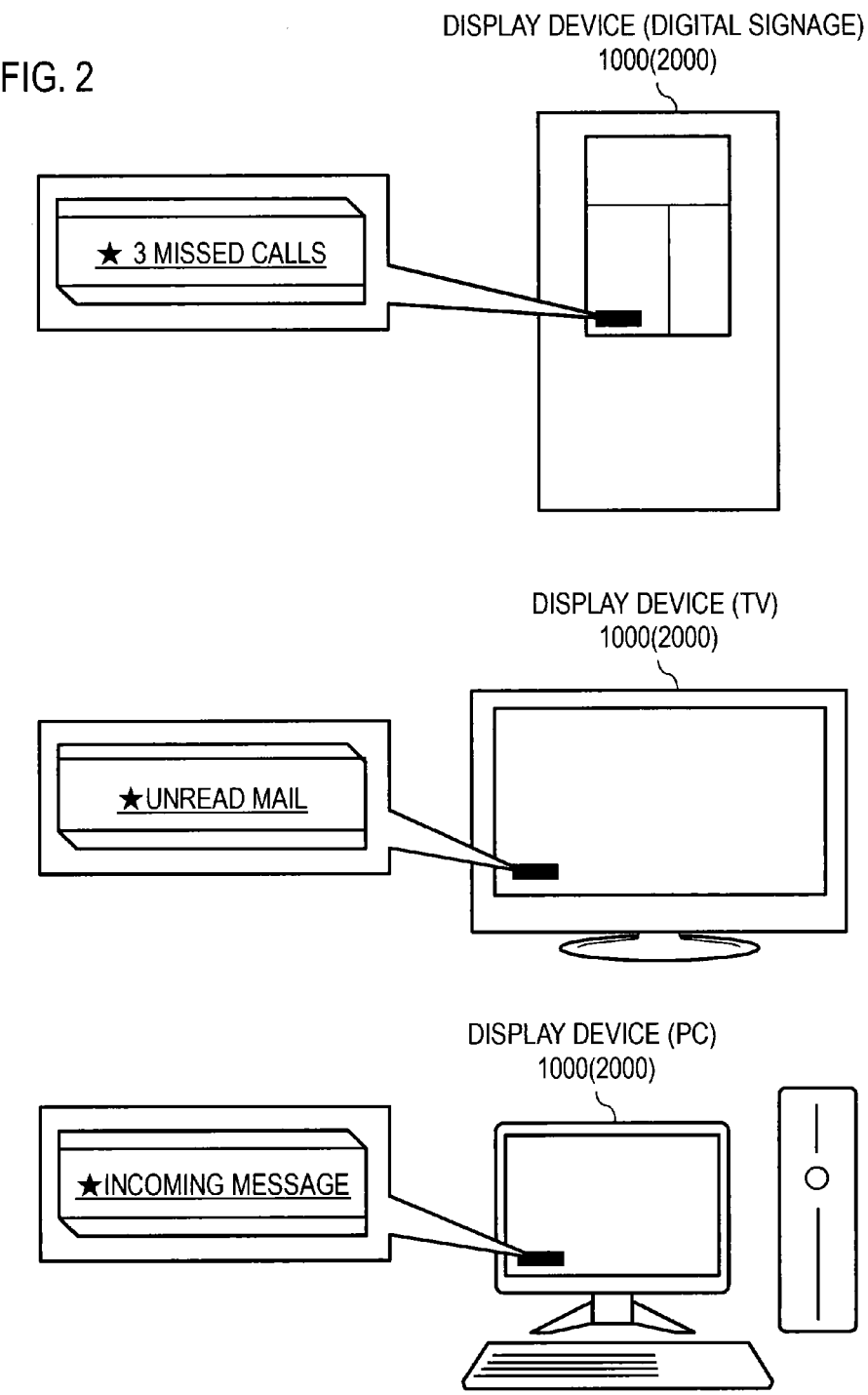
FIG. 2 is a diagram illustrating an example of a display device used in the information display system of the present invention.

An overview of the present invention will be provided below with reference to FIGS. 1 and 2. FIG. 1 is a diagram generally illustrating an information display system of the present invention. FIG. 2 is a diagram illustrating an example of a display device used in the information display system of the present invention.

As illustrated in FIG. 1, the information display system of the present invention includes a server, mobile equipment, and display devices. The information display system of the present invention requires at least one server, at least one piece of mobile equipment and a plurality of display devices. The display devices are distributed in different locations. The server and the mobile equipment, and the mobile equipment and each of the display devices can communicate with each other through a network (wireless LAN, cellular network, or the like). The mobile equipment and the display devices can communicate with each other by short-distance radio communication, for example Bluetooth (registered trademark). The short-distance radio communication is used for measuring the distance between each display device and the mobile equipment (inter-device distance). The information display system of the present invention aims to enable mobile equipment to send event information to a display device located near the mobile equipment through a wireless network (wireless LAN) to cause the display device located near the mobile equipment to display the event information it received to the user of the mobile equipment. Event information is information concerning a certain event that occurred on the mobile equipment (for example mail arrival information or incoming call information). A high level of convenience is provided for the user of the mobile equipment because the user of the mobile equipment can notice the event information through a display device near the user even if the mobile equipment is in a bag or pocket. Furthermore, according to the present invention, the mobile equipment assesses the surroundings to optimize the way in which event information is displayed, thereby preventing the user's personal information from being disclosed to the general public for a long period of time.

The display devices are not limited to any specific devices but may be any devices that are capable of communicating with mobile equipment through a wireless LAN, capable of communicating with mobile equipment through short-distance radio communication and have a display screen. For example, the display devices may be devices such as digital signage (public displays) or device such as televisions or a personal computers as illustrated in FIG. 2. As illustrated in FIG. 2, when an event is incoming call information, an event, "n missed calls", may be displayed; when an event is mail arrival, "Unread mail" may be displayed; when a mail is being received, "Incoming message" may be displayed. A symbol identifying the user of the mobile equipment may be added in case event information of a plurality of pieces of mobile equipment is displayed on a single display device. A black star sign is added in the example in FIG. 2. Adding a symbol identifying a user to event information in this way allows the user to know whether the event information displayed on the display device is directed to the user or to another person.

FIRST EMBODIMENT

Figure 3:
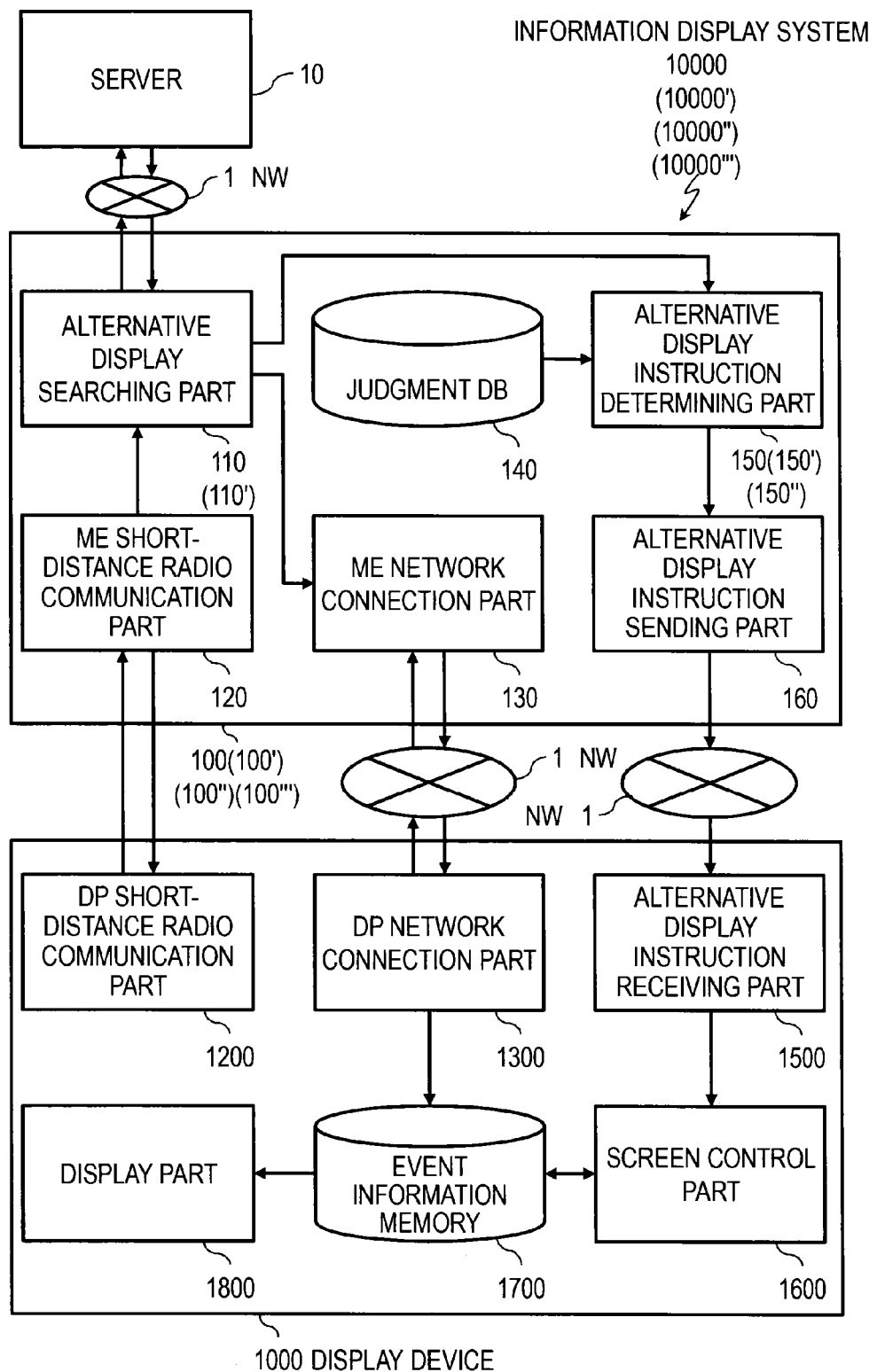
FIG. 3 is a block diagram illustrating a configuration of an information display system according to a first embodiment and a modification thereof.
Figure 4:
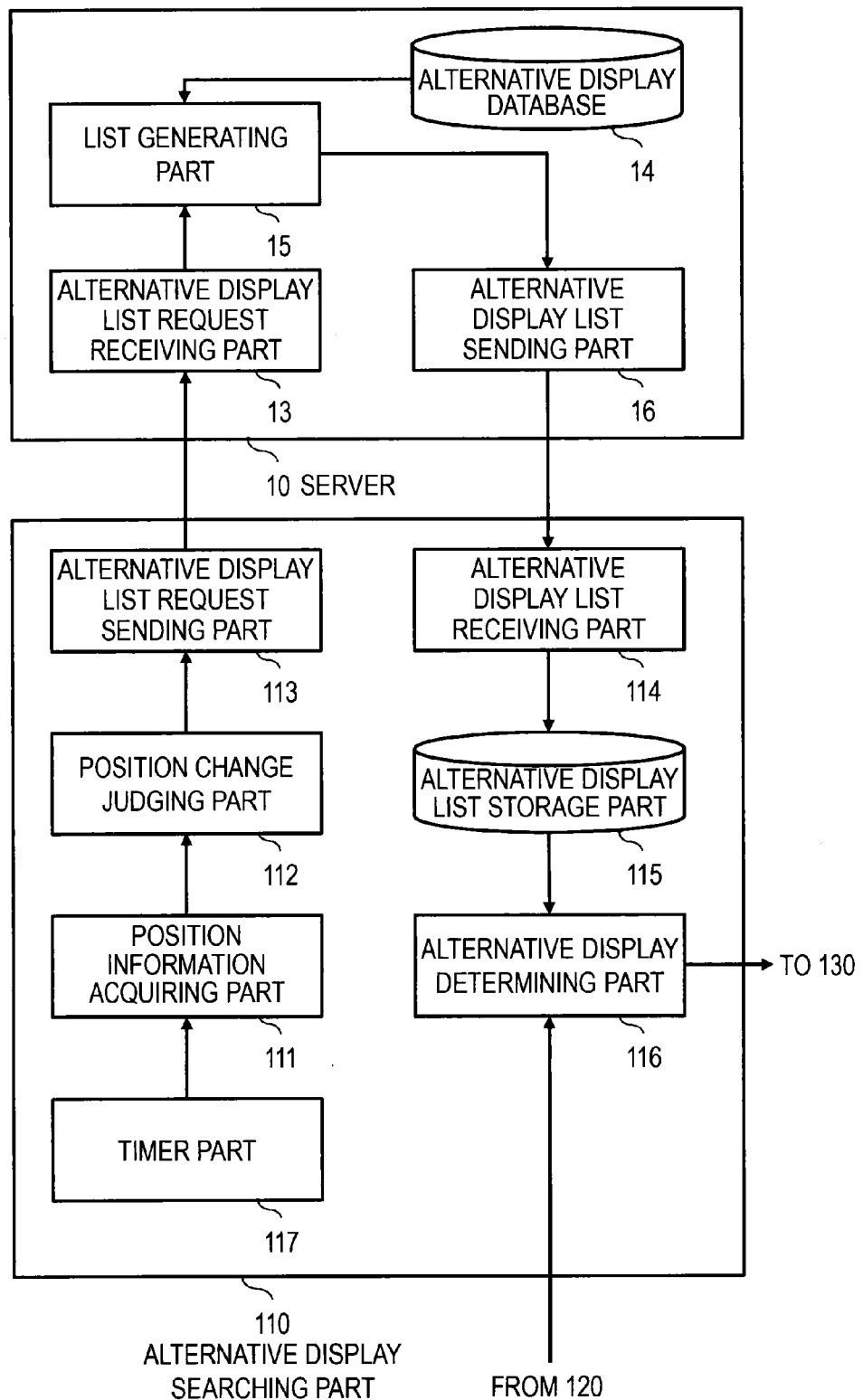
FIG. 4 is a block diagram illustrating configurations of a server and an alternative display searching part according to the first embodiment.
Figure 5:
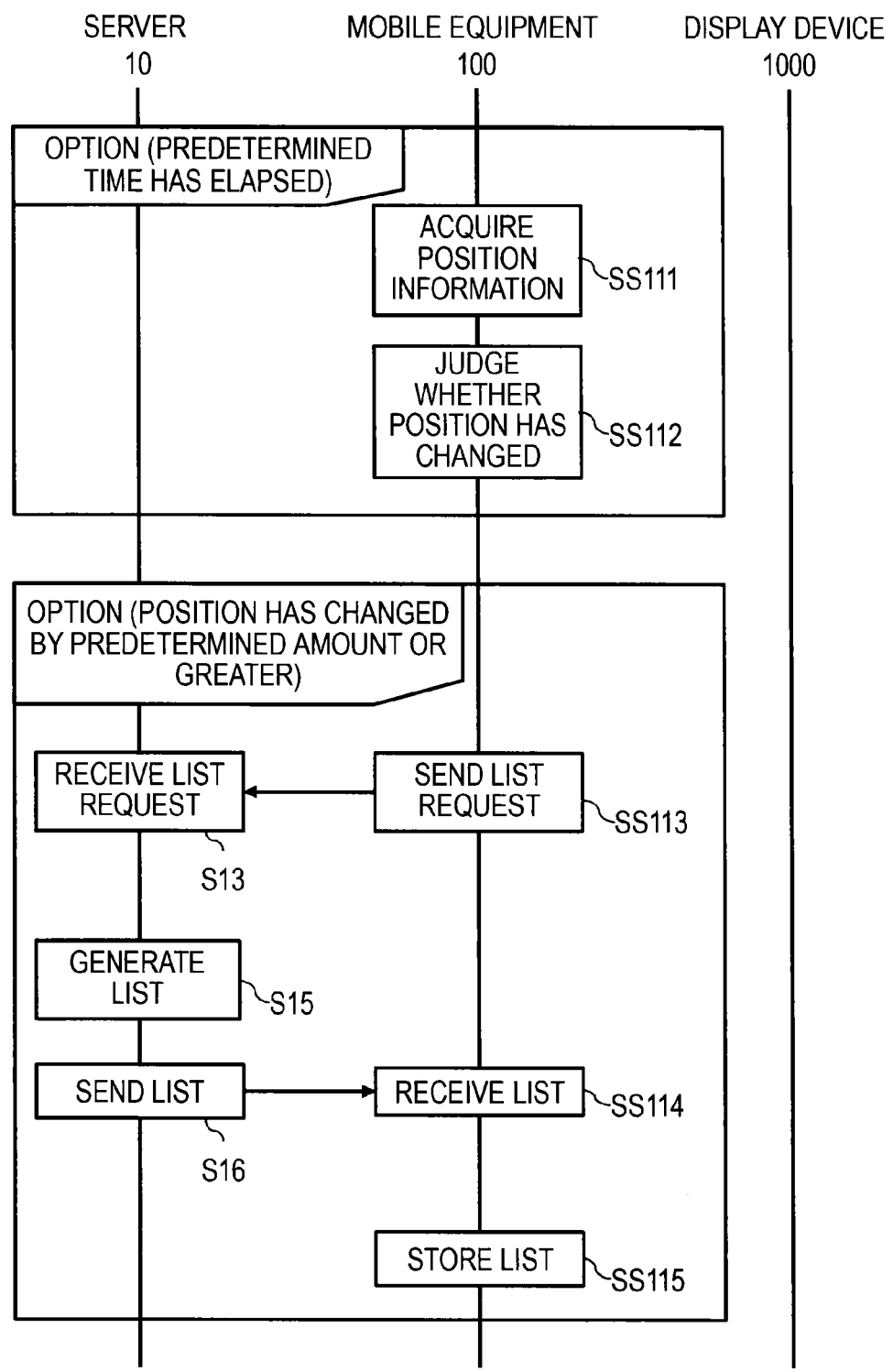
FIG. 5 is a sequence diagram illustrating operations of the server and the alternative display searching part according to the first embodiment.

Information display systems according to a first embodiment and first, second and third modifications of the first embodiment will be described below in detail with reference to FIGS. 3 to 15. FIG. 3 is a block diagram illustrating a configuration of an information display system 10000 (10000', 10000", 10000''') of the first embodiment and first, second and third modifications thereof. FIG. 4 is a block diagram illustrating configurations of a server 10 and an alternative display searching part 110. FIG. 5 is a sequence diagram illustrating operations of the server 10 and the alternative display searching part 110 of the first embodiment.

As illustrated in FIG. 3, the information display system 10000 of the first embodiment includes a server 10, mobile equipment 100, and display devices 1000. The information display system 10000' of the first modification includes a server 10, mobile equipment 100', which is a partially modified version of the mobile equipment 100, and display devices 1000. The information display system 10000" of the second modification includes a server 10, mobile equipment 100", which is a partially modified version of the mobile equipment 100, and display devices 1000. The information display system 10000''' of the third modification includes a server 10, mobile equipment 100''', which is a partially modified version of the mobile equipment 100, and display devices 1000.

The mobile equipment 100 of this embodiment includes an alternative display searching part 110, an ME short-distance radio communication part 120, an ME network connection part 130, a judgment DB 140, an alternative display instruction determining part 150, and an alternative display instruction sending part 160. The mobile equipment 100' of the first modification includes an alternative display searching part 110', which is a modified version of the alternative display searching part 110. The other components of the mobile equipment 100' are the same as those of the mobile equipment 100 of the first embodiment. The mobile equipment 100" of the second modification includes an alternative display instruction determining part 150', which is a modified version of the alternative display instruction determining part 150. The other components of the mobile equipment 100" are the same as those of the mobile equipment 100 of the first embodiment. The mobile equipment 100' of the third modification includes an alternative display instruction determining part 150", which is a modified version of the alternative display instruction determining part 150. The other components of the mobile equipment 100''' are the same as those of the mobile equipment 100 of the first embodiment.

Each of the display devices 1000, which are common to the first embodiment and the first, second and third modifications thereof, includes a DP short-distance radio communication part 1200, a DP network connection part 1300, an alternative display instruction receiving part 1500, a screen control part 1600, an event information memory 1700, and a display part 1800.

As illustrated in FIG. 4, the server 10, which is common to the first embodiment and the first, second and third modifications thereof includes an alternative display list request receiving part 13, an alternative display database 14, a list generating part 15, and an alternative display list sending part 16. The alternative display database 14 stores information identifying display devices 1000 and information indicating their locations in association with each other. The information indicating the locations may be latitude and longitude information, for example.

The alternative display searching part 110 of the mobile equipment 100 of the first embodiment includes position information acquiring part 111, position change judging part 112, alternative display list request sending part 113, alternative display list receiving part 114, alternative display list storage part 115, alternative display determining part 116, and timer part 117.

A procedure for the mobile equipment 100 to acquire an alternative display list from the server 10 will be described below. With the procedure, the mobile equipment 100 can acquire an alternative display list on which a number of display devices 1000 located near the mobile equipment 100 are identified from a database of display devices 1000 managed by the server 10. The display devices 1000 on the alternative display list are candidates for an alternative destination display devices on which event information, which will be described later, is to be displayed. As illustrated in FIG. 5, the position information acquiring part 111 acquires current position information indicating the current position of the mobile equipment 100 (SS111). The current position information may be GPS information, which will be described later, or base station information. A predetermined time interval may be preset in the timer part 117, for example, so that the position information acquiring part 111 acquires current position information at the predetermined time intervals (OPTION, PREDETERMINED TIME HAS ELAPSED). The position change judging part 112 compares the latest current position information with position information acquired at the previous time interval to judge whether or not the difference is greater than or equal to a predetermined value (SS112). This is a procedure required for detecting whether the mobile equipment 100 has moved or not. If the position of the mobile equipment 100 has not significantly changed, an alternative display list, which will be described later, previously acquired can be used without acquiring an alternative display list anew. When the difference between the latest current position information of the mobile equipment 100 and the position acquired at the previous time interval is greater than or equal to the predetermined value (OPTION, POSITION HAS CHANGED BY PREDETERMINED AMOUNT OR GREATER), the alternative display list request sending part 113 sends an alternative display list request including the current position information of the mobile equipment 100 to the server 10 (SS113).

The alternative display list request receiving part 13 of the server 10 receives the alternative display list request (S13). Based on the current position information of the mobile equipment 100 included in the received alternative display list request, the list generating part 15 selects an alternative display list from the alternative display database 14 mentioned above (S15). The alternative display list is a list of display devices 1000 that are located within a predetermined distance from the current position of the mobile equipment 100. The predetermined distance may be set to 150 m, for example. FIG. 19 illustrates an example of the alternative display list. As illustrated in FIG. 19, the alternative display list includes identifies of alternative destination display candidates (alternative display destination candidate numbers), display device IDs, network access points (such as ESSIDs, which are access point IDs), IP addresses of alternative destination displays, and alternative display instruction transmission trigger distances. Alternative display instruction transmission trigger distance is a distance set on each display device beforehand on the basis of the size of the display part of each display device and the environment in which each display device is installed. How this parameter is used will be described later. The alternative display list sending part 16 sends the alternative display list to the mobile equipment 100 (S16).

The alternative display list receiving part 114 of the alternative display searching part 110 of the mobile equipment 100 receives the alternative display list from the server 10 (SS114). The alternative display list receiving part 114 stores the received alternative display list in the alternative display list storage part 115 (SS115). This completes the alternative display list acquiring procedure of the present embodiment.

Figure 6:
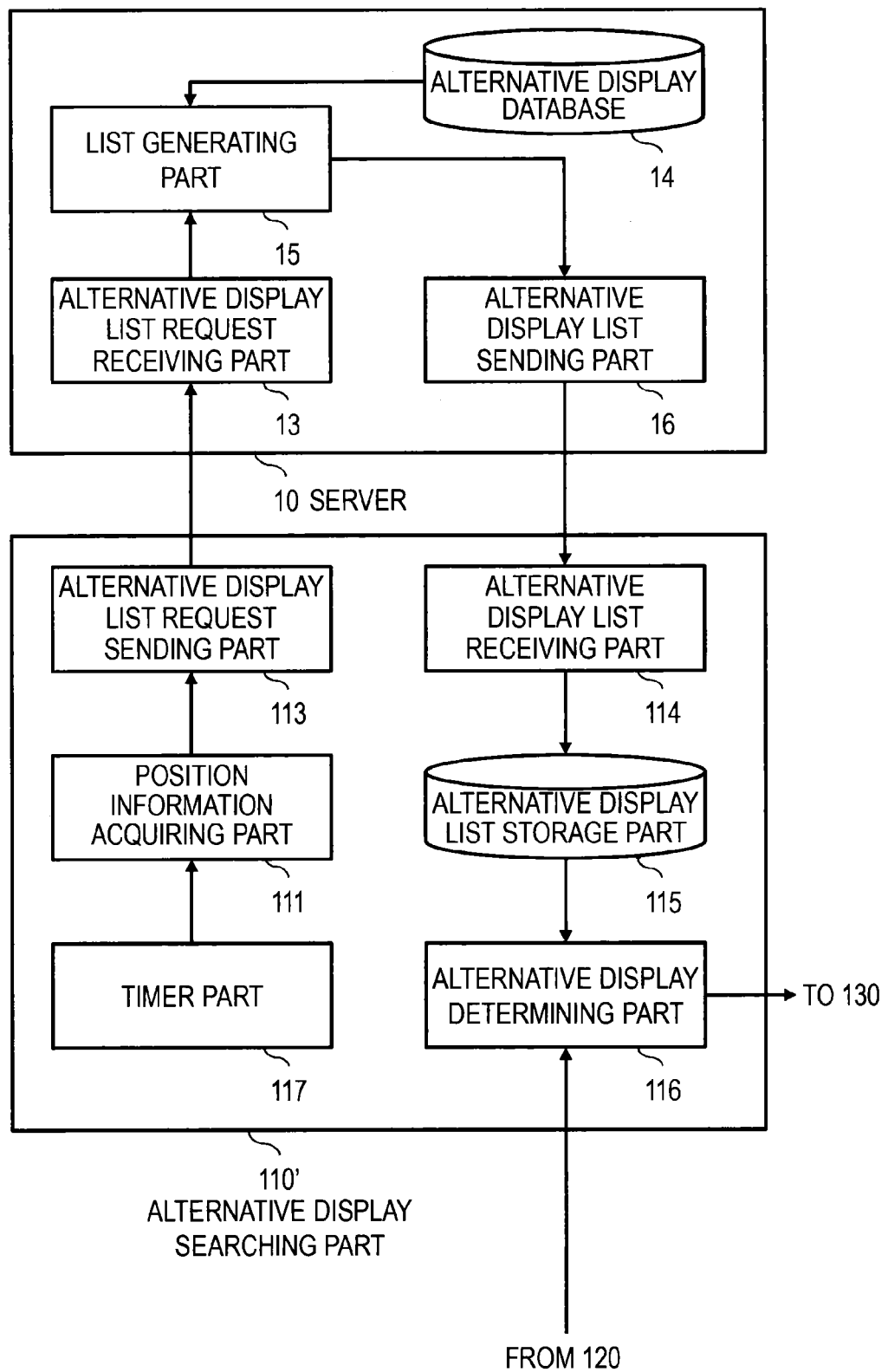
FIG. 6 is a block diagram illustrating a configuration of a server and an alternative display searching part according to a first modification.
Figure 7:
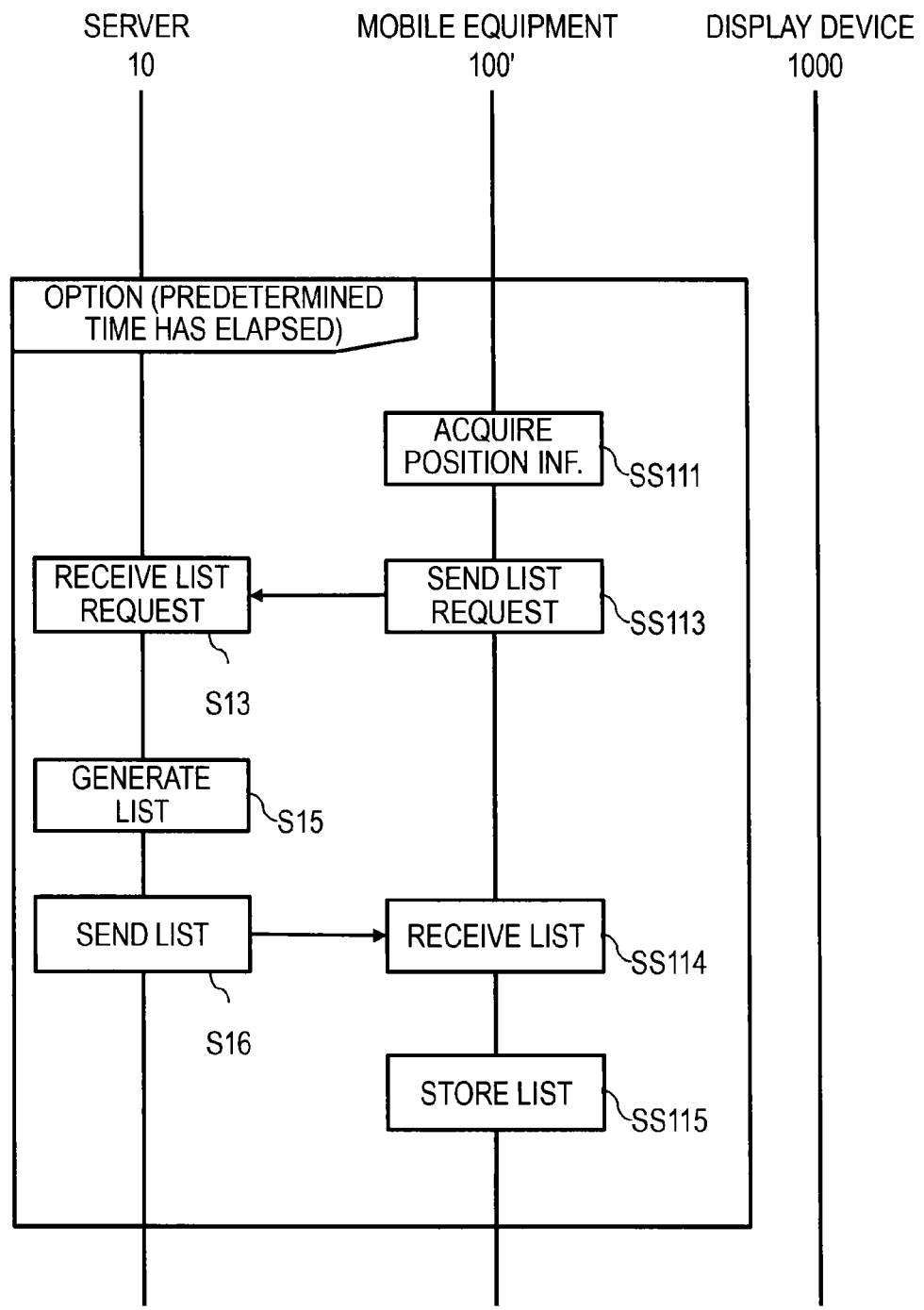
FIG. 7 is a sequence diagram illustrating operations of the server and the alternative display searching part according to the first modification.

The alternative display searching part 110' of the first modification, which is a modified version of the alternative display searching part 110 described above, will be described below with reference to FIGS. 6 and 7. FIG. 6 is a block diagram illustrating a configuration of the alternative display searching part 110' of the first modification. FIG. 7 is a sequence diagram illustrating operations of the alternative display searching part 110' according to the first modification. As illustrated in FIG. 6, the alternative display searching part 110' includes position information acquiring part 111, alternative display list request sending part 113, alternative display list receiving part 114, alternative display list storage part 115, alternative display determining part 116, and timer part 117. The alternative display searching part 110' differs from the alternative display searching part 110 only in that the alternative display searching part 110' does not include position change judging part 112. As illustrated in FIG. 7, the position information acquiring part 111 acquires the current position information of the mobile equipment 100' (SS111). A predetermined time interval may be preset in the timer part 117, for example, so that the position information acquiring part 111 acquires current position information at the predetermined time intervals (OPTION, PREDETERMINED TIME HAS ELAPSED). In this modification, judgment as to whether the position of the mobile equipment 100 has changed or not is not made. The alternative display list request sending part 113 directly sends an alternative display list request including the current position information of the mobile equipment 100 to the server 10 (SS113). Then steps S13, S15 and S16 and sub-steps SS114 and SS115 are performed. Accordingly, an alternative display list is acquired at predetermined time intervals regardless of whether or not the position of the mobile equipment 100' has been changed in the modification.

Figure 8:
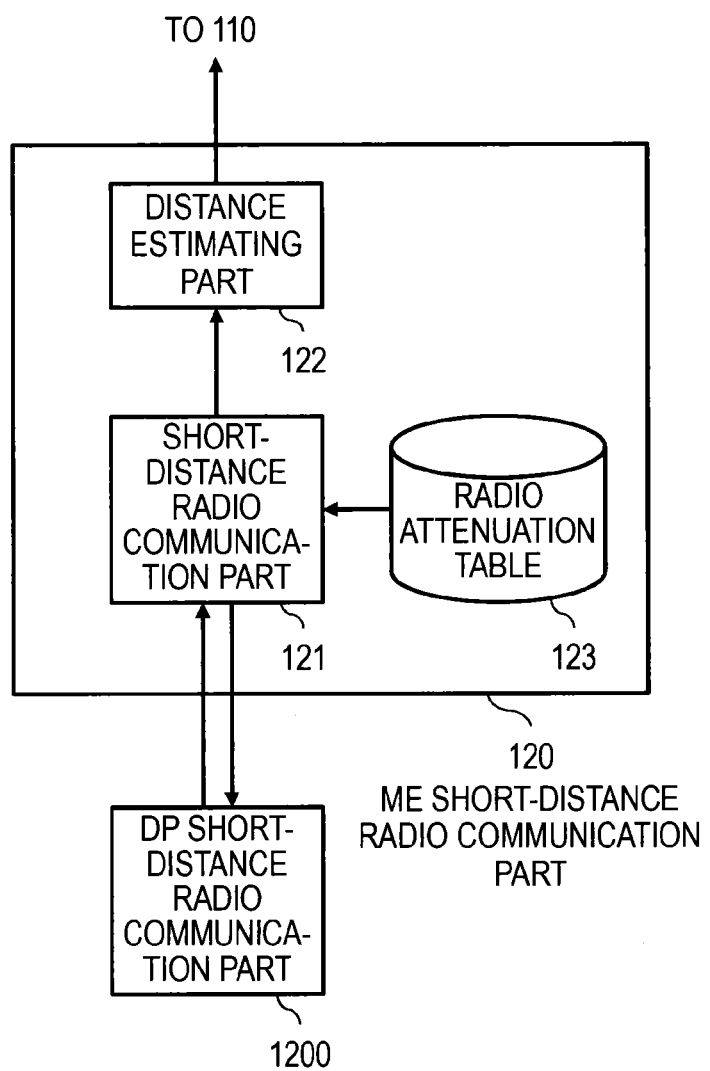
FIG. 8 is a block diagram illustrating a configuration of an ME short-distance radio communication part according to the first embodiment.
Figure 9:
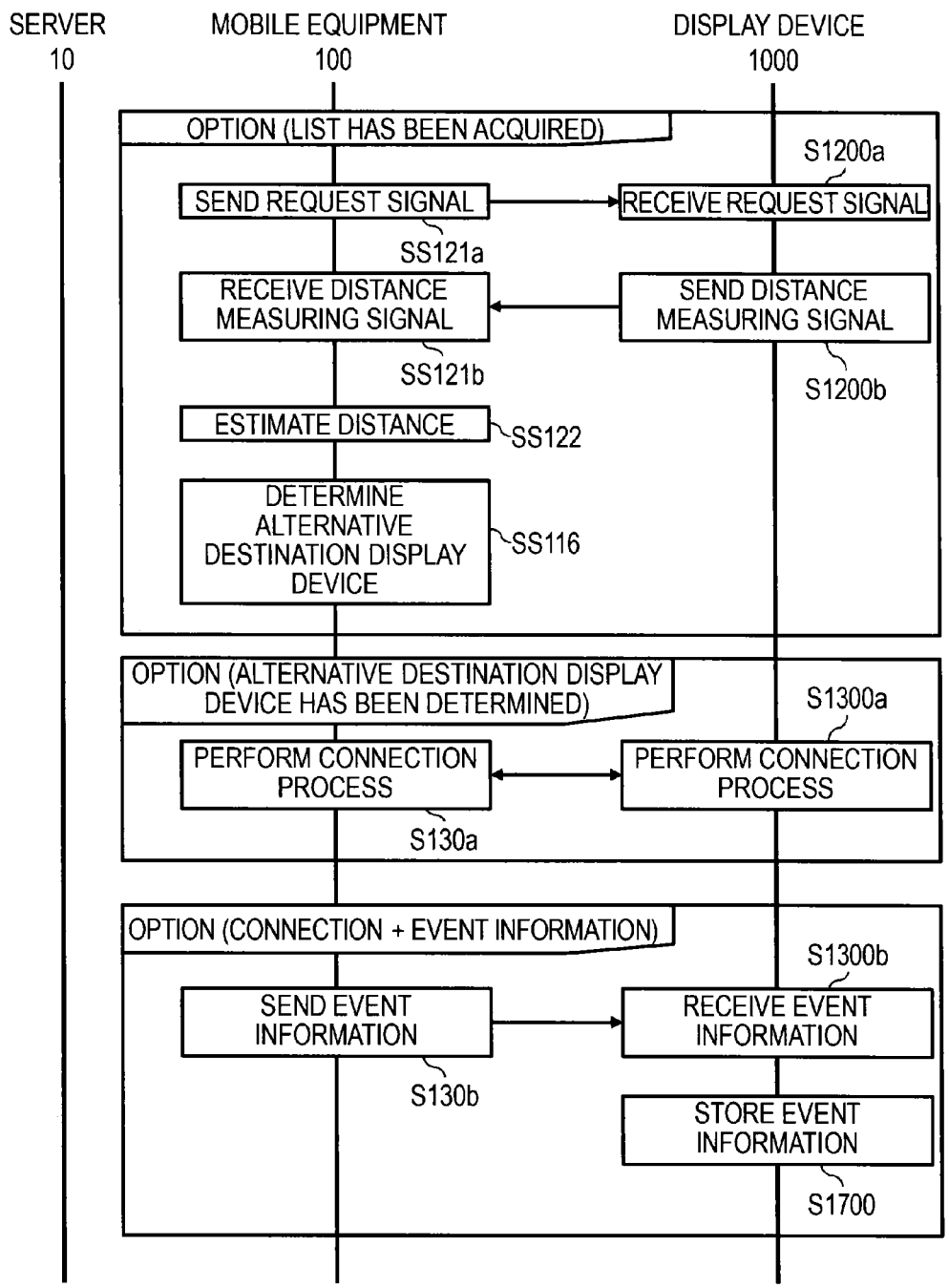
FIG. 9 is a sequence diagram illustrating operations of the ME short-distance radio communication part and a display device according to the first embodiment.

Returning to the description of the information display system 10000 of the first embodiment, a procedure for estimating the inter-device distance, a procedure for determining an alternative destination display device, a network connection procedure, and a procedure for sending event information will be described with reference to FIGS. 8 and 9. FIG. 8 is a block diagram illustrating a configuration of the ME short-distance radio communication part 120 of the first embodiment. FIG. 9 is a sequence diagram illustrating operations of the ME short-distance radio communication part 120 and a display device 1000 of the first embodiment. In this procedure, the inter-device distance between the mobile equipment 100 and the display device 1000 can be determined using near field communication (for example Bluetooth (registered trademark). The inter-device distance serves as information for judging whether or not the display device 1000 can function as an alternative destination display device. More specifically, the smaller the value of the inter-device distance, the closer the mobile equipment 100 is to the display device 1000 and therefore more likely the user of the mobile equipment 100 is closer to the display device 1000. A display device 1000 likely to be close to the user of the mobile equipment 100 is likely to be viewed by the user of the mobile equipment 100 and therefore is suitable for use as an alternative destination display device.

As illustrated in FIG. 8, the ME short-distance radio communication part 120 of the mobile equipment 100 of the first embodiment includes short-distance radio communication part 121, distance estimating part 122, and a radio attenuation table 123. The radio attenuation table 123 stores the relationship (which may be a measured value or a theoretical value) between the distance between a radio source and a receiving device and radio attenuation in short-range radio communication. As illustrated in FIG. 9, when the list acquisition procedure described above has already been performed (OPTION, LIST HAS BEEN ACQUIRED), the short-distance radio communication part 121 of the ME short-distance radio communication part 120 sends a distance measuring signal request signal (SS121a). The distance measuring signal can be received by a display device 1000 located sufficiently close to the mobile equipment 100 but cannot be received by a display device 1000 that is not close to the mobile equipment 100. With Bluetooth (registered trademark) mentioned above, the communication ranges are from 10 m to 100 m.

The DP short-distance radio communication part 1200 of a display device 1000 located near the mobile equipment 100 receives the distance measuring signal request signal (S1200a). The DP short-distance radio communication part 1200 which has received the distance measuring signal request signal sends a distance measuring signal and a display device ID to the mobile equipment 100 (S1200b). The display device ID may be the MAC address of a Bluetooth (registered trademark) unit used for distance measurement. The short-distance radio communication part 121 receives the distance measuring signal and the display device ID from the display device 1000 located close to the mobile equipment 100 (SS121b). The distance estimating part 122 measures the field strength of the received distance measuring signal and estimates the inter-device distance on the basis of the field strength (SS122). The estimated inter-device distance is sent to the alternative display determining part 116 of the alternative display searching part 110 along with the display device ID of the corresponding display device 1000. The alternative display determining part 116 refers to the display device IDs of the display devices 1000 on the alternative display list stored in the alternative display list storage part 115 and the display device IDs output from the distance estimating part 122 along with the inter-device distances to assign a corresponding inter-device distance to each of the display devices 1000 on the alternative display list. Here, an inter-device distance is not necessarily estimated for every display device 1000 on the alternative display list. For example, assume that all of the display devices 1000 located within 150 m from the current position of the mobile equipment 100 are listed on the alternative display list and that only the display devices 1000 located within 50 m from the mobile equipment 100 have successfully sent distance measuring signals by the short-distance radio communication mentioned above. Then estimated inter-device distances cannot be obtained for the display devices 1000 located at distances greater than or equal to 50 m from the mobile equipment 100 among the display devices 1000 on the alternative display list. In this case, inter-device distances are not assigned to those display devices 1000. A display device 1000 to which the smallest inter-device distance is assigned among the display devices 1000 that are on the alternative display list and that have estimated inter-device distances smaller than the alternative display instruction transmission trigger distances set on the alternative display list is most suitable for use as a display device (alternative destination display device). Accordingly, the alternative display determining part 116 selects as an alternative destination display device a display device 1000 to which the smallest inter-device distance is assigned among the display devices 1000 that are on the alternative display list and that have estimated inter-device distances smaller than the alternative display instruction transmission trigger distances set on the alternative display list (SS116). Note that the alternative display determining part 116 may simply select a display device 1000 to which the smallest inter-device distance is aligned among the display devices 1000 on the alternative display list without using the alternative display instruction transmission trigger distances.

The alternative display determining part 116 may select a predetermined plural number of display devices 1000 as alternative destination display devices among the display devices 1000 having estimated inter-device distances smaller than the alternative display instruction transmission trigger distances set on the alternative display list in ascending order of assigned inter-device distance. Alternatively, the alternative display determining part 116 may select a predetermined plural number of display devices 1000 among the display devices 1000 on the alternative display list in ascending order of assigned inter-device distance without using the alternative display instruction transmission trigger distances.

When an alternative destination display device is determined at sub-step SS116 (OPTION, ALTERNATIVE DESTINATION DISPLAY DEVICE HAS BEEN DETERMINED), the ME network connection part 130 of the mobile equipment 100 negotiates with an access point having an ESSID which can be acquired from the alternative display list to establish communication with the DP network connection part 1300 through the network (WLAN) (S130a). Similarly, the DP network connection part 1300 of the display device 1000 selected as the alternative destination display device establishes communication with the ME network connection part 130 of the mobile equipment 100 through negotiation at the access point of the network (WLAN) (S1300a). Note that if a predetermined plural number of alternative destination display devices are selected as stated above, communication may be established with all of the plurality of alternative destination display devices and event information, which will be described later, may be sent to all of those alternative destination display devices. Here, if an event as described above has occurred on the mobile equipment 100 (OPTION, CONNECTION+EVENT INFORMATION), the ME network connection part 130 of the mobile equipment 100 sends event information to the DP network connection part 1300 of the display device 1000 that serves as the alternative destination display device (S130b). The DP network connection part 1300 of the display device 1000 serving as the alternative destination display device receives the event information from the ME network connection part 130 of the mobile equipment 100 (S1300b). The DP network connection part 1300 of the display device 1000 serving as the alternative destination display device stores the even information it received in the event information memory 1700 (S1700).

Figure 10:
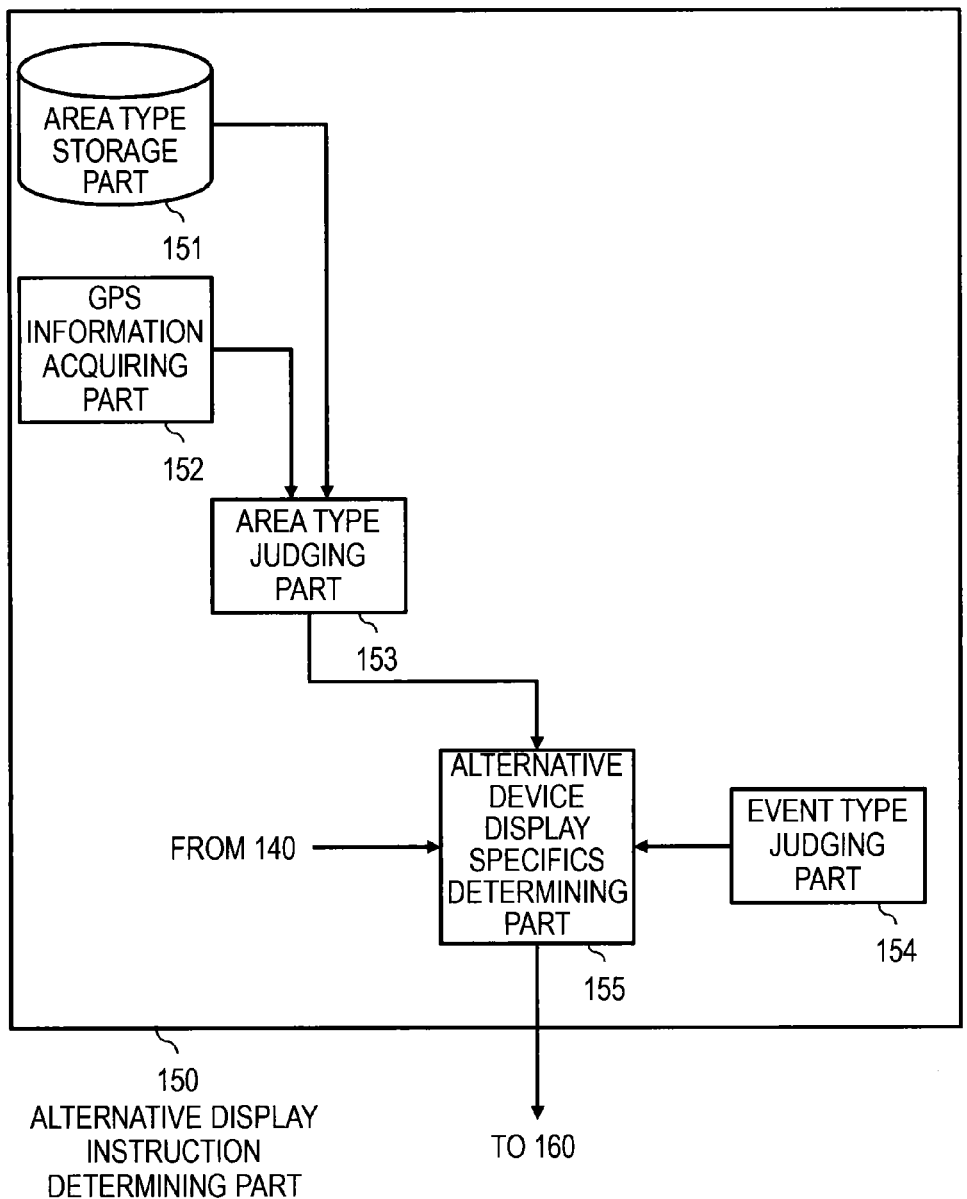
FIG. 10 is a block diagram illustrating a configuration of an alternative display instruction determining part according to the first embodiment.
Figure 11:
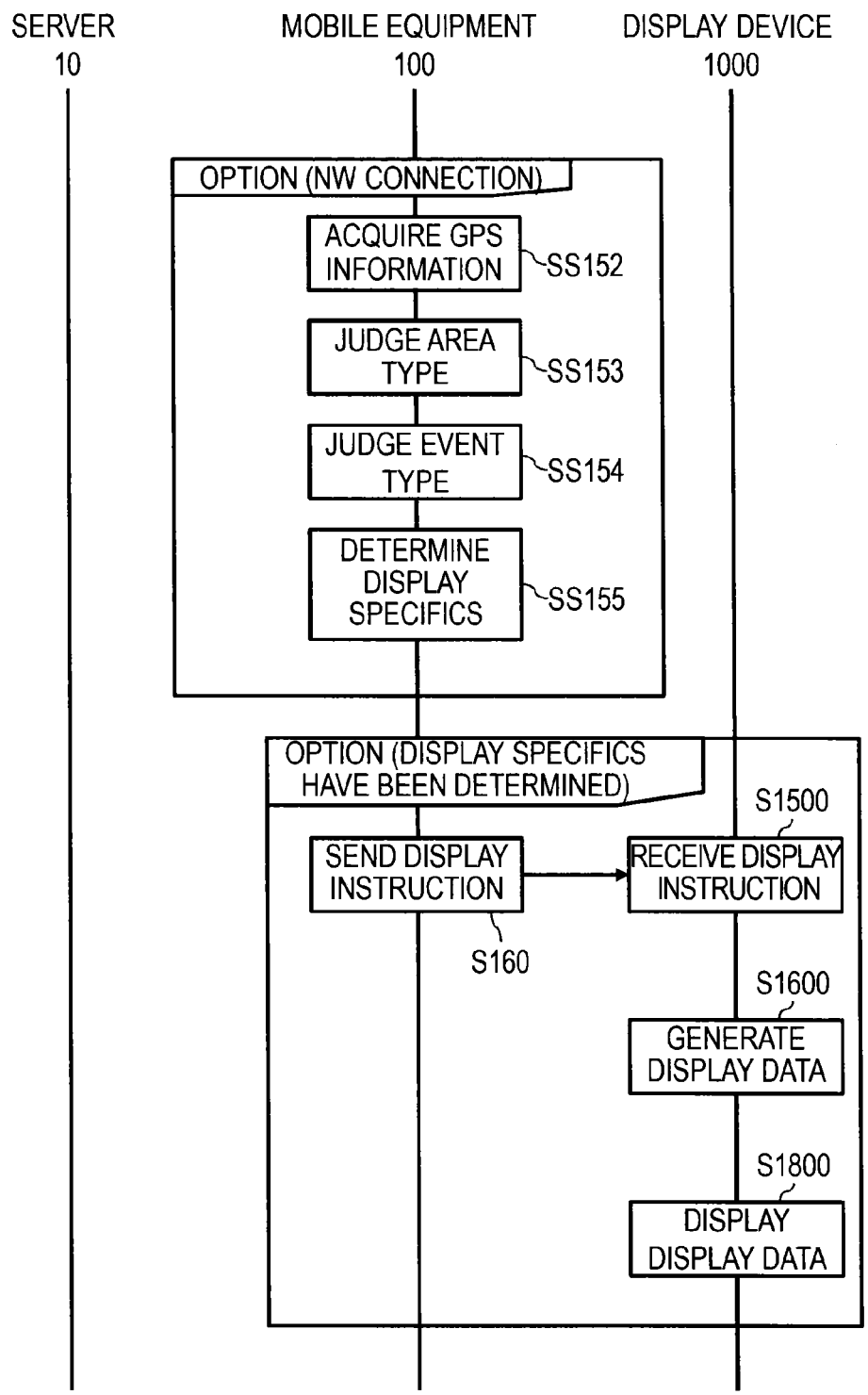
FIG. 11 is a sequence diagram illustrating operations of the alternative display instruction determining part and a display device according to the first embodiment.

A procedure for determining display specifics, a procedure for sending a display instruction, and a procedure for displaying event information will be described below in detail with reference to FIGS. 10 and 11. These procedures are required for optimally displaying and controlling event information sent to an alternative destination display device according to the statuses of mobile equipment and the alternative destination display device. FIG. 10 is a block diagram illustrating a configuration of an alternative display instruction determining part 150 of the first embodiment. FIG. 11 is a sequence diagram illustrating operations of the alternative display instruction determining part 150 and the display device 1000 (alternative destination display device) of the first embodiment. As illustrated in FIG. 10, the alternative display instruction determining part 150 of the mobile equipment 100 of the first embodiment includes area type storage part 151, GPS information acquiring part 152, area type judging part 153, event type judging part 154, and alternative device display specifics determining part 155. Predetermined area types are stored in the area type storage part 151 in association with GPS information. An area type is an attribute added in terms of whether the area is likely to belong to a public space or a private space. Area types may include residential area and commercial area, for example. The distinction between indoors and outdoors may be added to provide four area types: commercial area (outdoor), commercial area (indoor), residential area (outdoor) and residential area (indoor). If the current position of the mobile equipment 100 indicated by GPS information is in a commercial area, the user of the mobile equipment 100 is likely to be in a public space (a space where there is traffic of general public). On the other hand, if the current position of the mobile equipment 100 indicated by GPS information is in a residential area, the user of the mobile equipment 100 is likely to be in a private space (a space where there is not traffic of general public). As illustrated in FIG. 11, when a network connection is established between the mobile equipment 100 and the display device 1000 serving as the alternative destination display device (OPTION, NW CONNECTION), the GPS information acquiring part 152 acquires GPS information indicating the current position of the mobile equipment 100 (SS152). The area type judging part 153 refers to the area type storage part 151 described above to judge the area type associated with the acquired GPS information (SS153). The event type judging part 154 judges the type of an event that has occurred on the mobile equipment 100 (for example mail arrival or incoming call) (SS154). It is assumed here that display specifics corresponding to combinations of area type and event type have been predetermined and stored as a table in the judgment DB 140. The alternative device display specifics determining part 155 refers to the judgment DB 140 on the basis of the judged area type and the event type to determine display specifics of a display to display on the alternative destination display device (SS155). Display specifics are information that specifically defines the way in which event information is displayed on an alternative destination display device. Display specifics may include permission/prohibition to display, display duration and display size, for example. Accordingly, if the area type is commercial area, information can be prevented from being displayed, or permitted to be displayed for only a short time or in a small size. On the other hand, if the area type is residential area, it may be determined that the mobile equipment 100 is unlikely to be in an environment where there is traffic of general public, and information may be displayed for a longer time in a larger size than when the area type is commercial area. In the case of an event type that is not so important, information may be prevented from being displayed; in the case of an event type that is important (for example information indicating 10 incoming calls), the information may be permitted to be displayed for a long time in a large size.

When display specifics have been determined (OPTION, DISPLAY SPECIFICS HAVE BEEN DETERMINED), the alternative display instruction sending part 160 sends a display instruction including the display specifics to the display device 1000 serving as the alternative destination display device (S160). The alternative display instruction receiving part 1500 of the display device 1000 serving as the alternative destination display device receives the display instruction from the mobile equipment 100 (S1500). The screen control part 1600 of the display device 1000 serving as the alternative destination display device generates display data concerning event information in accordance with the display instruction (S1600). The display part 1800 of the display device 1000 serving as the alternative destination display device displays the display data (S1800). In this way, mobile equipment 100 of the first embodiment determines display specifics on the basis of GPS information indicating the current position of the mobile equipment 100 and the event type. However, the parameters used for determining display specifics are not limited to GPS information and the items of information mentioned above; any parameter that indicates the status of the mobile equipment 100, any parameter that indicates the status of the alternative destination display device or any parameter that indicates the status of an event that has occurred may be used.

Figure 12:
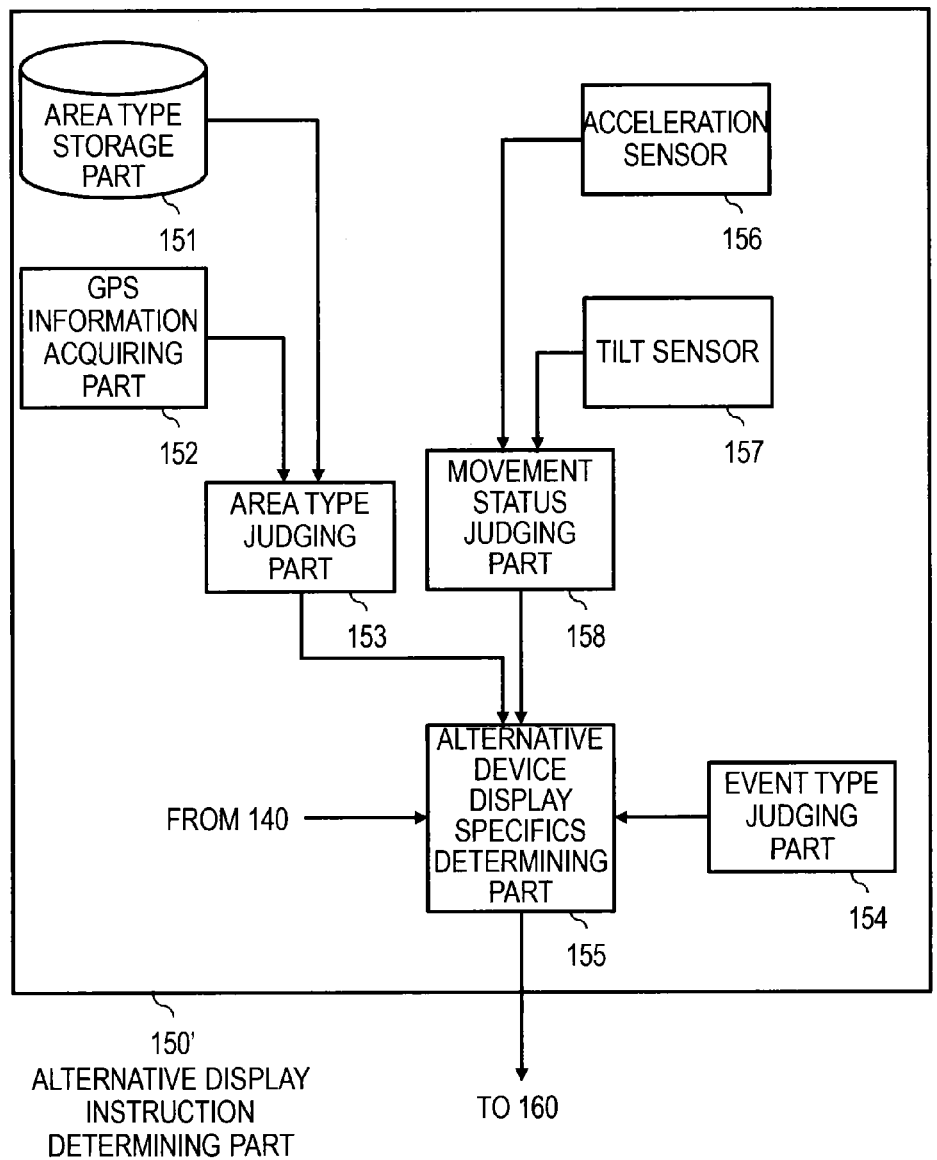
FIG. 12 is a block diagram illustrating a configuration of an alternative display instruction determining part according to a second modification.
Figure 13:
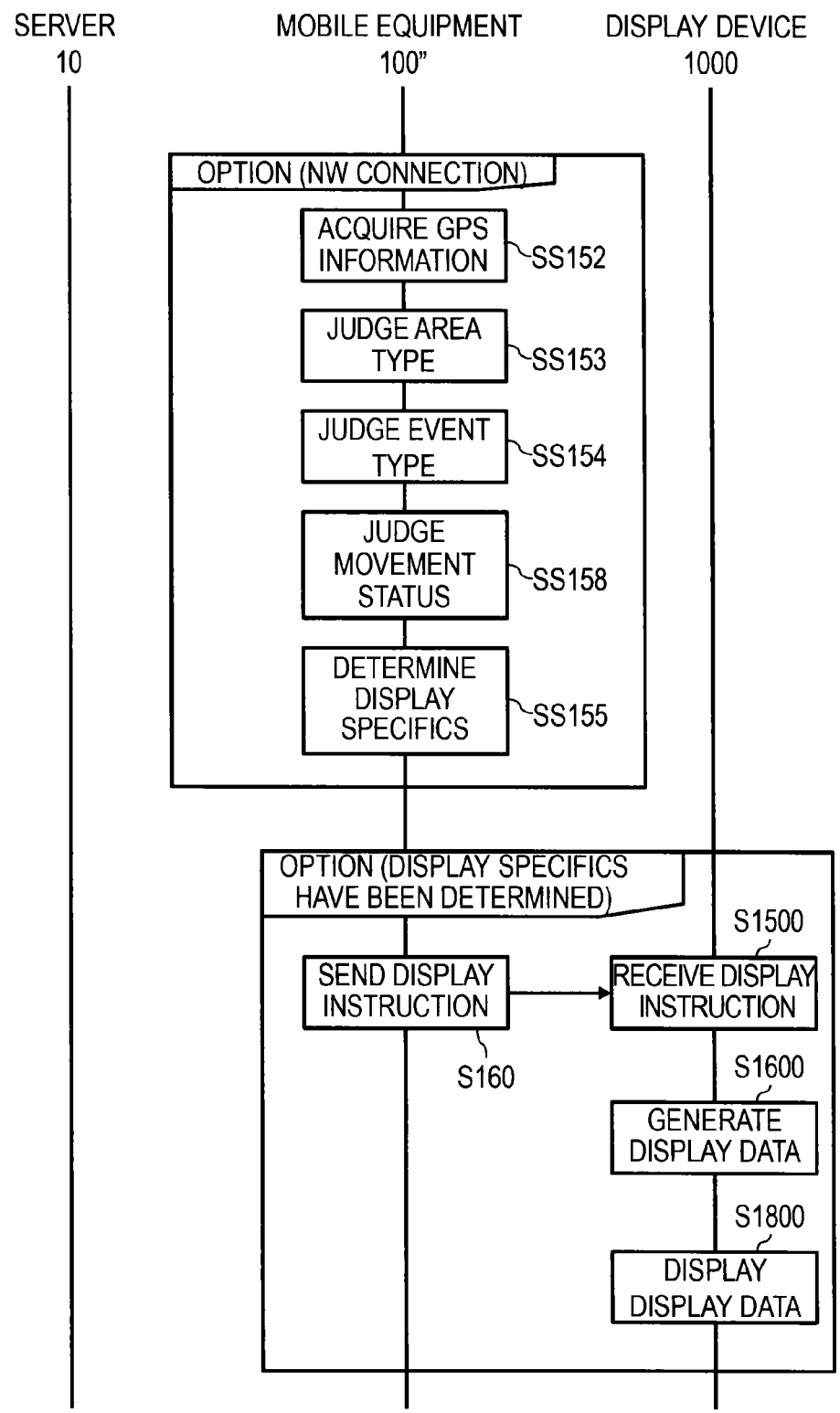
FIG. 13 is a sequence diagram illustrating operations of the alternative display instruction determining part and a display device according to the second modification.

An information display system 10000″ of the second modification in which variations of parameters are considered will be described with reference to FIGS. 12 and 13. FIG. 12 is a block diagram illustrating a configuration of an alternative display instruction determining part 150' of the second modification. FIG. 13 is a sequence diagram illustrating operations of the alternative display instruction determining part 150' and a display device 1000 (alternative destination display device) of the second modification. As illustrated in FIG. 12, the alternative display instruction determining part 150' of mobile equipment 100" of the second modification includes area type storage part 151, GPS information acquiring part 152, area type judging part 153, event type judging part 154, alternative device display specifics determining part 155, an acceleration sensor 156, a tilt sensor 157 and movement status judging part 158. The alternative display instruction determining part 150' of the second modification includes the acceleration sensor 156, the tilt sensor 157 and movement status judging part 158, which are not included in the alternative display instruction determining part 150 of the mobile equipment 100 of the first embodiment. The other components of the second modification are the same as those of the first embodiment. In the second modification, information indicating the acceleration and information indicating the tilt of the mobile equipment 100" are used as parameters indicating the state of the mobile equipment 100". Specifically, the acceleration information and tilt information are used to judge whether the user of the mobile equipment 100" is currently at a standstill, walking, running, or on a moving train, that is, to judge the movement status of the mobile equipment 100". The alternative device display specifics determining part 155 determines display specifics on the basis of the movement status. For example, when the user of the mobile equipment 100" is at a standstill, the user is likely to view an alternative destination display device; when the user is walking or running, the user is unlikely to view an alternative destination display device. When the user of the mobile equipment 100" is on a moving train, an alternative destination display device is likely to be a public display installed in the train because connection with the alternative destination display device has been successfully established at step S130a. In this case, the user and the public display in the train are moving at a certain speed but there is little change in the relative positional relationship between the user and the public display, which is as if the user is at a standstill. Accordingly, the user is likely to view the alternative destination display device. Display specifics for a situation where the alternative destination display device is likely to be viewed, display specifics may be set so that information is permitted to be displayed for a long display duration in a large display size; for a situation where an alternative destination display device is unlikely to be viewed, display specifics may set so that information is permitted to be displayed for a short display duration or in a small display size.

As illustrated in FIG. 13, the movement status judging part 158 of this variation acquires acceleration information from the acceleration sensor 156 and the angle of tilt of the mobile equipment 100" from the tilt sensor 157 and judges the movement status of the mobile equipment 100", namely judges whether the user of the mobile equipment 100" is at a standstill or walking or running or on a train, from changes in the acceleration information and tilt angle with time (SS158). Sub-steps SS152, SS153 and SS154, which are operations of the same components as those in the first embodiment, are performed in the same way as in the first embodiment. Display specifics associated with combinations of area type, event type and movement status have been predetermined and stored as a table in the judgment DB 140. The alternative device display specifics determining part 155 refers to the judgment DB 140 on the basis of the movement status described above in addition to the area type and event type to determine display specifics for a display on the alternative destination display device (SS155). Then steps S160, S1500, S1600 and S1800 are performed in the same way as in the first embodiment.

Figure 14:
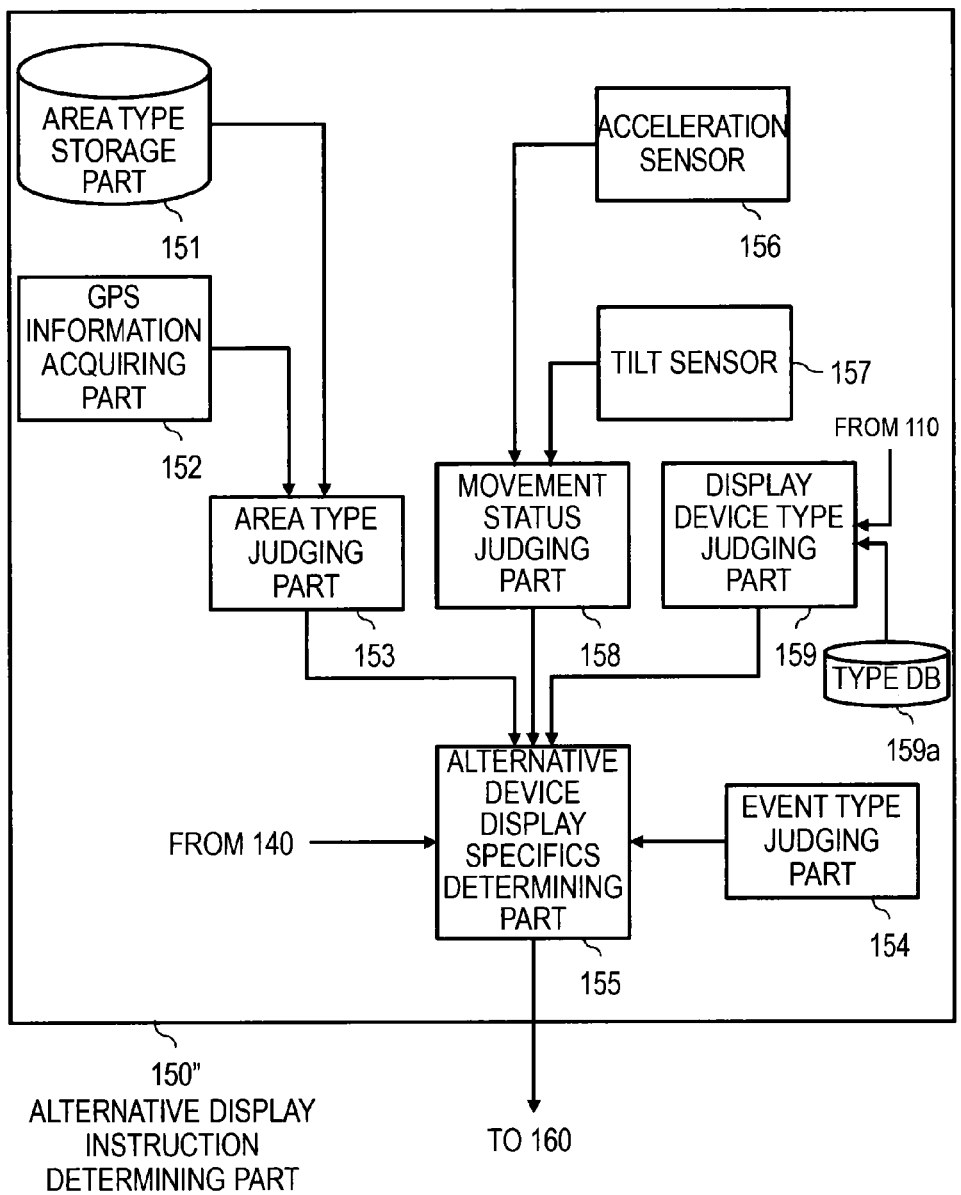
FIG. 14 is a block diagram illustrating a configuration of an alternative display instruction determining part according to a third modification.
Figure 15:
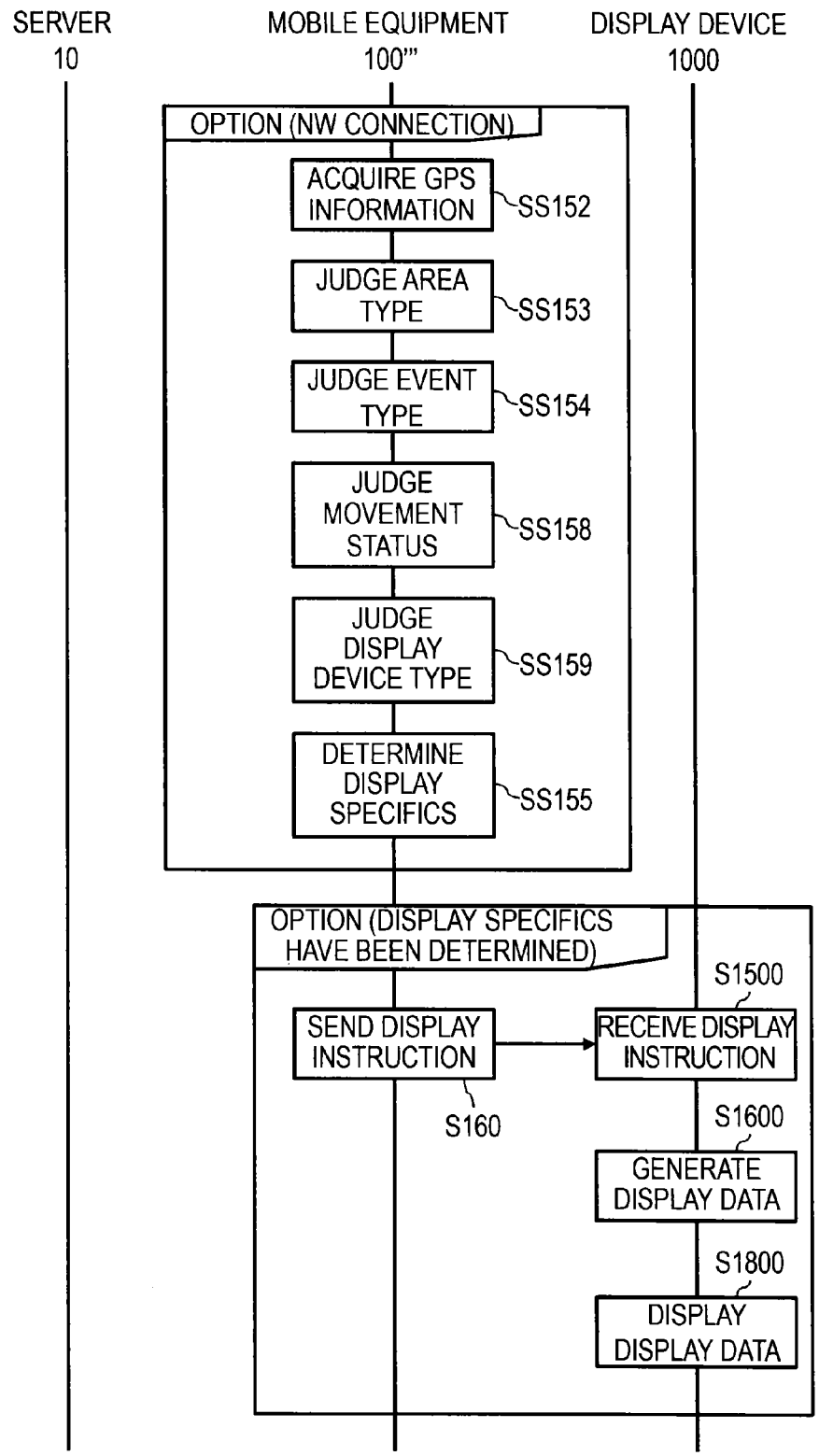
FIG. 15 is a sequence diagram illustrating operations of the alternative display instruction determining part and a display device according to the third modification.

An information display system 10000' of the third modification in which other variations of parameters are considered will be described with reference to FIGS. 14 and 15. FIG. 14 is a block diagram illustrating a configuration of an alternative display instruction determining part 150" of the third variation. FIG. 15 is a sequence diagram illustrating operations of the alternative display instruction determining part 150" and a display device 1000 (alternative destination display device) of the third variation. As illustrated in FIG. 14, the alternative display instruction determining part 150" of the mobile equipment 100' of the third modification includes area type storage part 151, GPS information acquiring part 152, area type judging part 153, event type judging part 154, alternative device display specifics determining part 155, an acceleration sensor 156, a tilt sensor 157, movement status judging part 158, display device type judging part 159, and type DB 159a. The alternative display instruction determining part 150" of the third modification includes the display device type judging part 159 and the type DB 159a, which are not included in the alternative display instruction determining part 150' of the mobile equipment 100" of the second modification. The other components are the same as those of the second modification. Display IDs described above and the types of display devices 1000 are stored beforehand in the type DB 159a in association with each other. In the third modification, the type of a display device 1000 that serves as an alternative destination display device is used as a parameter. The type may be any of the display device 1000 types illustrated in FIG. 2, for example, and an alternative destination display device may be judged to be of any of the types such as digital signage, TV, and PC. Based on the type, an alternative device display specifics determining part 155 determines display specifics. If the alternative destination display device is digital signage, the alternative destination display device is likely to be viewed by general public. On the other hand, if the alternative destination display device is a PC, the alternative destination display device is likely to be installed at the user's office or the user's home and therefore is less unlikely to be viewed by general public than digital signage. If the alternative destination display device is digital signage (a public display), for example, information may be prevented from being displayed or may be displayed for a short duration in a small size. If the alternative destination display device is a PC, the alternative destination display device is likely to be on the user's desk at the user's office (a semi-private environment) or at the user's home (a private environment), therefore information may be displayed for a longer time in a larger size than if the alternative destination display device is a public display. If the alternative destination display device is a TV, the alternative destination display device is likely to be at the user's home (a private environment), therefore a longer display duration and a larger display size may be set than if the alternative destination display device is a PC.

As illustrated in FIG. 15, the display device type judging part 159 of this modification acquires the display device ID of a display device 1000 serving as an alternative destination display device from the alternative display searching part 110, refers to the type DB 159a to acquire the display device type associated with the acquired display device ID and judges the type of the display device 1000 that serves as the alternative destination display device (SS159). Sub-steps SS152, SS153 and SS154, which are operations of the same components as those in the first embodiment, are performed in the same way as in the first embodiment. Display specifics associated with combinations of area type, event type, movement status and display device type have been predetermined and stored as a table in the judgment DB 140. FIG. 20 illustrates an example of the table stored in the judgment DB 140. As illustrated in FIG. 20, display specifics which are items of information, namely text, image, display duration, and display size, are predetermined for combinations of event type, area type, movement status and display device type and stored in the judgment DB 140 beforehand. TEXT defines a message to be displayed. For example, the following messages may be defined: "There is an unread mail" or "Unread mail" to be displayed when there is one unread mail; a message "N unread mails" or "Unread mail (N)" to be displayed when there are multiple unread mails; and a message "There is a missed call" or "Missed call" to be displayed when there is one missed call. IMAGE defines an image to be displayed along with the text given above. The image files are stored beforehand in the judgment DB 140 or any other memory. As illustrated in FIG. 20, different images may be defined for different event types. For example, an image file, xx.jpg, is assigned to the event type "Unread mail", an image file, yy.jpg, is assigned to the event type "Missed call", and an image file, zz.jpg, is assigned to the event type "Receiving". A symbol used by a user for identifying him/herself (a black star in the example described) as described earlier may be stored as an image file and the image file may be specified in the table in the judgment DB 140. DISPLAY DURATION specifies a display duration for event information. A longer display duration may be set for an event type of a greater importance, for example. In the example in FIG. 20, a longer display duration is specified for more than one unread mail than for one unread mail. The display duration may vary according to movement status of the mobile equipment. When the user of the mobile equipment is walking, the user of the mobile equipment is likely to quickly pass by the alternative destination display device and therefore display duration does not need to be long. In contrast, for a situation where the user of the mobile equipment is at a standstill, a long display duration may be set to increase the possibility of the displayed information catching the eye of the user. A larger display size may be set for an event type of a greater importance. If the display device is of a type that has a larger display part, such as a public display, than other types of display devices (such as PC and TV), a relatively large event information display size needs to be set.

The alternative device display specifics determining part 155 refers to judgment DB 140 to determine specifics of a display on the alternative destination display device on the basis of the type of the display device, in addition to the judged area type, event type and movement status (SS155). Then steps S160, S1500, S1600 and S1800 are performed in the same way as in the first embodiment.

In this way, in the information display systems 10000 (10000', 10000", 10000"') of the first embodiment and the first, second and third modifications thereof, the ME short-distance radio communication part 120 performs short-distance radio communication with a display device 1000 to estimate the inter-device distance. Accordingly, a display device 1000 located near the mobile equipment 100 and therefore is likely to catch the eye of the user can be selected as an alternative destination display device, thus providing a higher level of convenience for the user. Furthermore, since the alternative display instruction determining part 150 (150', 150") of the mobile equipment 100 (100', 100', 100"') can use any parameter that indicates the status of the mobile equipment 100 (100', 100", 100"') or any parameter that indicates the status of the alternative destination display device 1000 or any parameter that indicates the status of an event that has occurred to properly predict surroundings of the user and determine display specifics appropriate for the surroundings of the user, a higher level of convenience can be provided for the user.

SECOND EMBODIMENT

Figure 16:
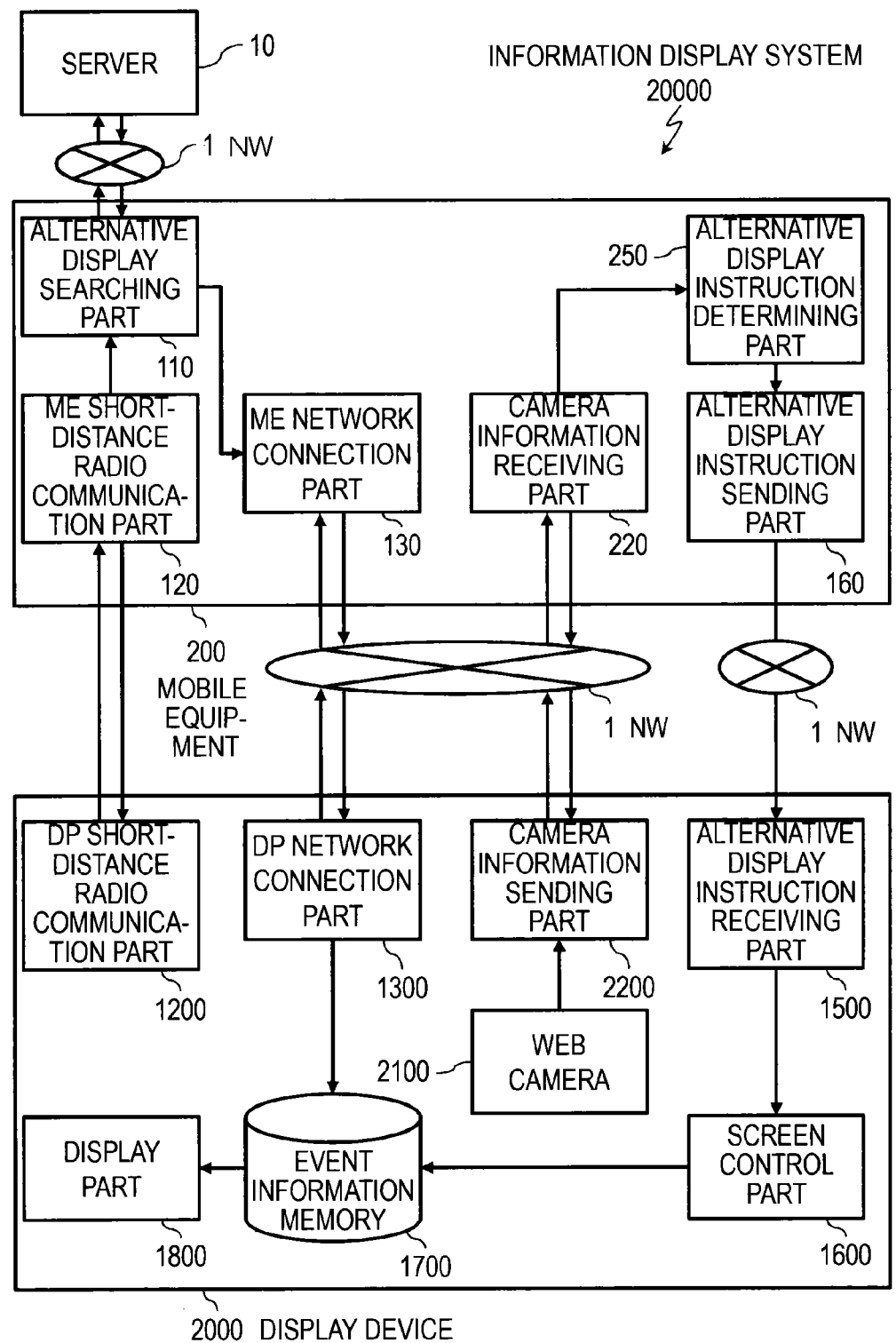
FIG. 16 is a block diagram illustrating a configuration of an information display system according to a second embodiment.
Figure 17:
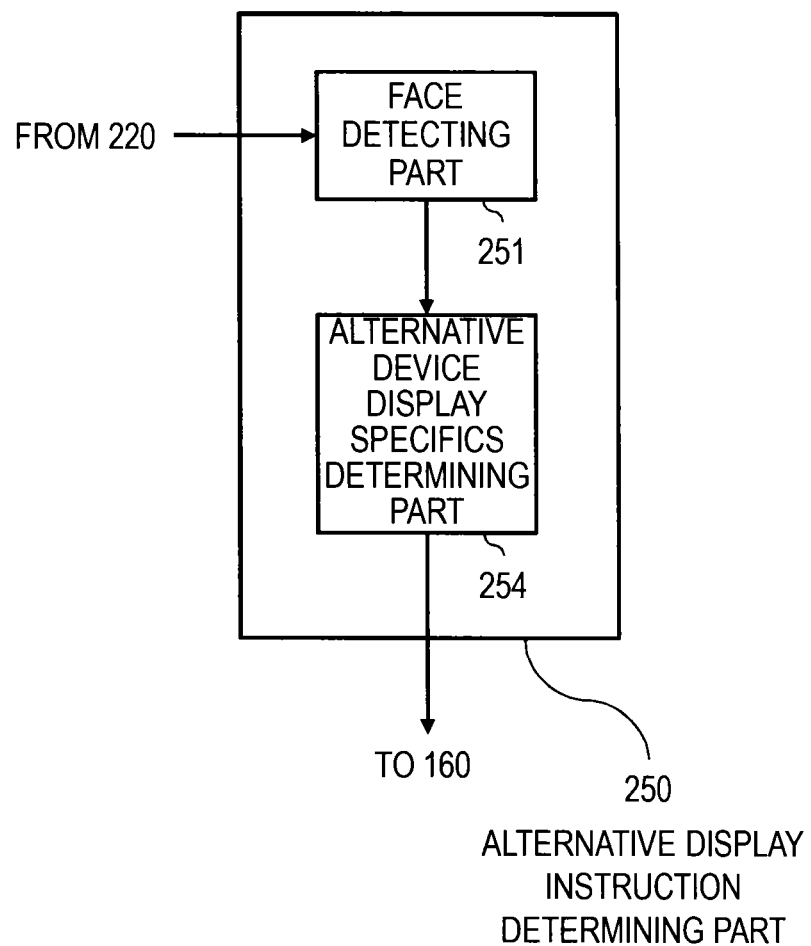
FIG. 17 is a block diagram illustrating an alternative display instruction determining part according to the second embodiment.
Figure 18:
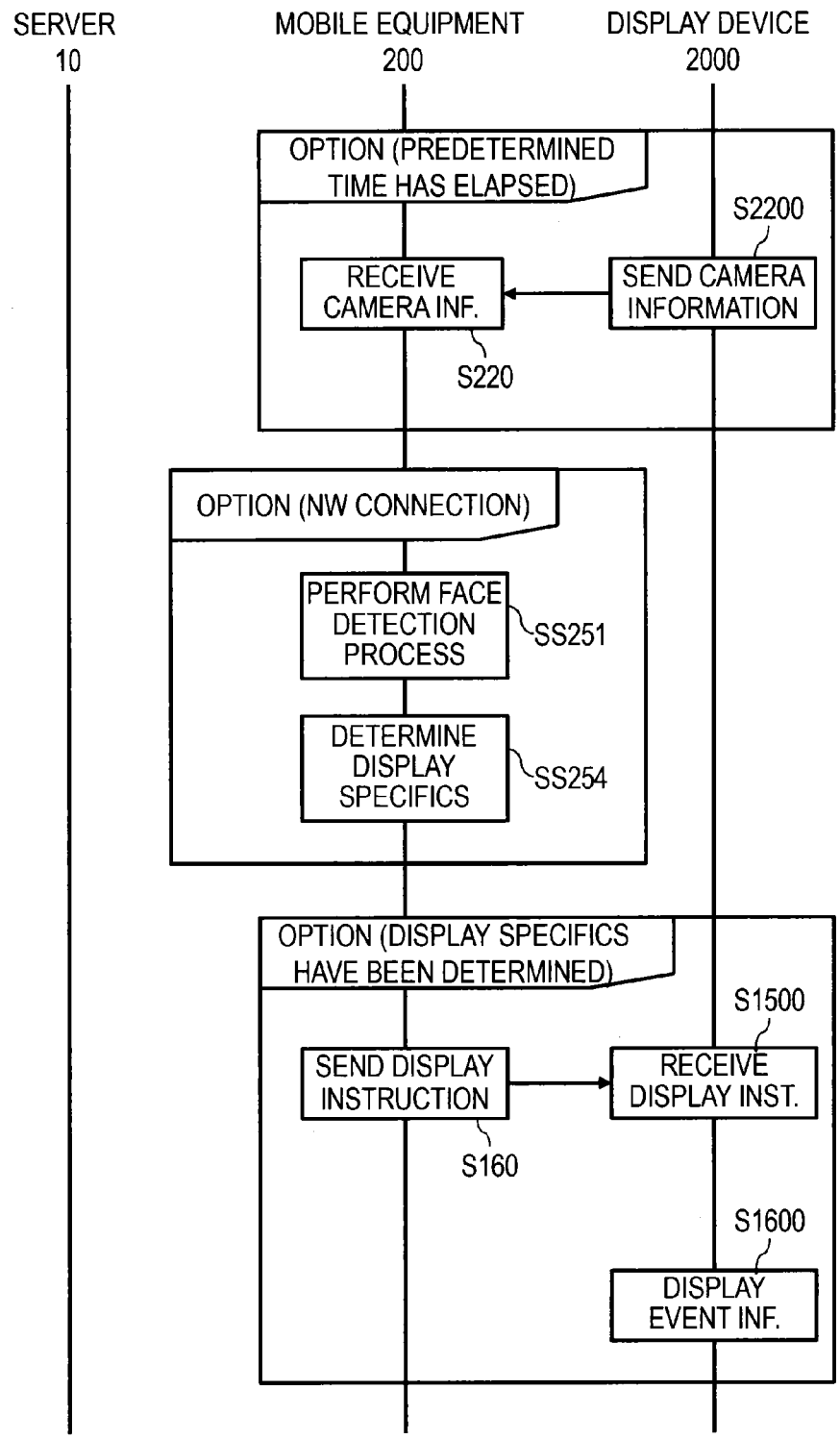
FIG. 18 is a sequence diagram illustrating operations of the alternative display instruction determining part and a display device according to the second embodiment.

An information display system of a second embodiment, which is similar to the information display system 10000 of the first embodiment except that the function of analyzing moving images is added will be described next with reference to FIGS. 16, 17 and 18. FIG. 16 is a block diagram illustrating a configuration of an information display system 20000 of the second embodiment. FIG. 17 is a block diagram illustrating a configuration of an alternative display instruction determining part 250 of the second embodiment. FIG. 18 is a sequence diagram illustrating operations of the alternative display instruction determining part 250 and a display device 2000 of the second embodiment.

As illustrated in FIG. 16, the information display system 20000 of the second embodiment includes a server 10, mobile equipment 200, and display devices 2000. The server 10 of the second embodiment is the same as the server 10 of the first embodiment. The mobile equipment 200 of the second embodiment includes an alternative display searching part 110, an ME short-distance radio communication part 120, an ME network connection part 130, a camera information receiving part 220, an alternative display instruction determining part 250, and an alternative display instruction sending part 160. The mobile equipment 200 of the second embodiment differs from the mobile equipment 100 of the first embodiment in that the mobile equipment 200 of the second embodiment does not include a judgment DB 140 which the mobile equipment 100 of the first embodiment includes and that the mobile equipment 200 of the second embodiment includes the camera information receiving part 220 which the mobile equipment 100 of the first embodiment does not include. Each of the display devices 2000 of the second embodiment includes a DP short-distance radio communication part 1200, a DP network connection part 1300, a WEB camera 2100, a camera information sending part 2200, an alternative display instruction receiving part 1500, a screen control part 1600, an event information memory 1700, and a display part 1800. The display device 2000 of the second embodiment differs from the display device 1000 of the first embodiment in that the display device 2000 of the second embodiment includes the WEB camera 2100 and the camera information sending part 2200 which the display device 1000 of the first embodiment does not include. As illustrated in FIG. 17, the alternative display instruction determining part 250 of the mobile equipment 200 of the second embodiment includes face detecting part 251 and alternative device display specifics determining part 254. The WEB camera 2100 of the display device 2000 captures moving image information of surroundings of a display device 2000. As illustrated in FIG. 18, the camera information sending part 2200 of the display device 2000 sends moving image information to the mobile equipment 200 at predetermined time intervals (OPTION, PREDETERMINED TIME HAS ELAPSED) (S2200).

The camera information receiving part 220 receives moving image information indicating surroundings of the display device 2000 that serves as an alternative destination display device (S220). The face detecting part 251 of the alternative display instruction determining part 250 of the mobile equipment 200 acquires a parameter indicating whether the received moving image information contains a human face (SS251). The face detecting part 251 uses a well-known face detection algorithm. A typical face detection algorithm scans a whole image of interest with a search window (a judgment region to which face detection processing is applied) having the size of a human face to judge whether the portion of the image in the search window is an image of a human face or not at every set of coordinates through which the search window passes. The window-by-window judgment process is performed across the entire image to recognize the search window location that is ultimately judged as a face region as the location of a human face detected. The window-by-window judgment uses template-matching or machine-learning-based pattern recognition.

The alternative device display specifics determining part 254 of the alternative display instruction determining part 250 determines specifics of a display to be displayed on the alternative destination display device on the basis of the parameter indicating whether a human face has been found (SS254). For example, when the parameter indicates that no human face has been found, it is obvious that there is not a person, which may be the user of the mobile equipment 200, around the alternative destination display device or that there is a person but the person is at least not looking at the display screen of the alternative destination display device. Accordingly, the alternative display instruction determining part 250 may determine not to provide a display. On the other hand, if the parameter indicates that a human face has been found, the user of the mobile equipment 200 is likely to be looking at the alternative destination display device. Accordingly, the alternative display instruction determining part 250 may determine to provide a display. The face detection function described above may be replaced with the function of detecting a human shape or a human figure, for example. Alternatively, rougher information such as whether there is a moving object around the alternative destination display may be detected. Components (the WEB camera 2100, the camera information sending part 2200, and the camera information receiving part 220) added in the second embodiment may also be added to the first embodiment and the first, second and third modifications thereof. In that case, the alternative display instruction determining part can use a parameter obtained through face detection, human shape detection, or moving object detection to determine display specifics while at the same time use the judgment DB 140 to determine display specifics, and then determine display specifics on the basis of the combination of the determinations to determine display specifics. For example, if display specifics are determined using the judgment DB 140 but a human face is not detected in moving image information, the alternative display instruction determining part may give priority to the face detection parameter to determine not to provide a display. On the other hand, if a human face is found in moving image information, the alternative display instruction determining part may determine display specifics on the basis of display specifics determined by referring to the judgment DB 140.

As has been described, the information display system 20000 of this embodiment uses a parameter indicating the presence of a person, which may be the user, to determine display specifics. Accordingly, the information display system 20000 has the effect of appropriately providing a display of event information by taking into consideration the possibility that the user is looking at the alternative destination display device, in addition to the effects of the first embodiment.

The processes described above may be performed not only in time sequence as is written or may be performed in parallel with one another or individually, depending on the throughput of the apparatuses that perform the processes or requirements. It would be understood that other modifications can be made without departing from the spirit of the present invention.

If any of the configurations described above is implemented by a computer, the processes of the functions the apparatuses need to include are described by a program. The processes of the functions are implemented on the computer by executing the program on the computer.

The program describing the processes can be recorded on a computer-readable recording medium. The computer-readable recording medium may be any recording medium such as a magnetic recording device, an optical disc, a magneto-optical recording medium, and a semiconductor memory, for example.

The program is distributed by selling, transferring, or lending a portable recording medium on which the program is recorded, such as a DVD or a CD-ROM. The program may be stored on a storage device of a server computer and transferred from the server computer to other computers over a network, thereby distributing the program.

A computer that executes the program first stores the program recorded on a portable recording medium or transferred from a server computer into a storage device of the computer. When the computer executes the processes, the computer reads the program stored on the recording medium of the computer and executes the processes according to the read program. In another mode of execution of the program, the computer may read the program directly from a portable recording medium and execute the processes according to the program or may execute the processes according to the program each time the program is transferred from the server computer to the computer. Alternatively, the processes may be executed using a so-called ASP (Application Service Provider) service in which the program is not transferred from a server computer to the computer but process functions are implemented by instructions to execute the program and acquisition of the results of the execution. Note that the program in this mode encompasses information that is provided for processing by an electronic computer and is equivalent to the program (such as data that is not direct commands to a computer but has the nature that defines processing of the computer).

While the apparatuses are configured by causing a computer to execute a predetermined program in the embodiments described above, at least some of the processes may be implemented by hardware.

What is claimed is:

1. Mobile equipment communicating with a server and a display device, the mobile equipment comprising:
   an alternative display searching part acquiring current position information indicating a current position of the mobile equipment, sending an alternative display list request including the current position information to the server, receiving from the server an alternative display list representing a list of display devices located within a predetermined distance from the current position, selecting and determining a display device from among the display devices listed on the alternative display list on the basis of an inter-device distance between the mobile equipment and each of the display devices, the selected display device being a display device serving as an alternative destination display device;

an ME (Mobile equipment) short-distance radio communication part sending a distance measuring signal request signal to the display devices by short-distance radio communication, receiving a distance measuring signal sent from the display devices to measure a field strength of the distance measuring signal, and estimating the inter-device distance on the basis of the field strength;

an ME (Mobile equipment) network connection part establishing communication with the alternative destination display device and, when a predetermined event occurs on the mobile equipment, sending event information notifying the occurrence of the event to the alternative destination display device;

an alternative display instruction determining part acquiring a parameter indicating a status of the mobile equipment, a status of the alternative destination display device, or a status of the event that has occurred and determining, on the basis of the parameter, display specifics of a display on the alternative destination display device; and an alternative display instruction sending part sending a display instruction including the display specifics to the alternative destination display device.

2. The mobile equipment according to claim 1, comprising GPS information indicating the current position of the mobile equipment as the parameter indicating the status of the mobile equipment, wherein the alternative display instruction determining part comprising:

a GPS information acquiring part for acquiring the GPS information;

an area type storage part for storing predetermined area types in association with the GPS information;

an area type judging part for judging an area type associated with the acquired GPS information; and an alternative device display specifics determining part for determining, on the basis of the judged area type, display specifics of a display on the alternative destination display device.

3. The mobile equipment according to claim 1, comprising acceleration information indicating acceleration of the mobile equipment as the parameter indicating the status of the mobile equipment;

wherein the alternative display instruction determining part comprises:

an acceleration sensor acquiring the acceleration information;

a movement status judging part for judging a movement status of the mobile equipment from the acquired acceleration information; and an alternative device display specifics determining part for determining display specifics of a display on the alternative destination display device on the basis of the judged movement status.

4. The mobile equipment according to claim 1, comprising type information indicating a type of the alternative destination display device as the parameter indicating the status of the alternative destination display device, wherein the alternative display instruction determining part comprises:

a display device type judging part for judging the type of the alternative destination display device; and an alternative device display specifics determining part for determining, on the basis of the judged type, display specifics of a display on the alternative destination display device.

5. Mobile equipment communicating with a server and a display device, the mobile equipment comprising:

an alternative display searching part acquiring current position information indicating a current position of the mobile equipment, sending an alternative display list request including the current position information to the server, receiving from the server an alternative display list representing a list of display devices located within a predetermined distance from the current position, selecting and determining a display device from among the display devices listed on the alternative display list on the basis of an inter-device distance between the mobile equipment and each of the display devices, the selected display device being a display device serving as an alternative destination display device;

an ME (Mobile equipment) short-distance radio communication part sending a distance measuring signal request signal to the display devices by short-distance radio communication, receiving a distance measuring signal sent from the display devices to measure a field strength of the distance measuring signal, and estimating the inter-device distance on the basis of the field strength;

an ME (Mobile equipment) network connection part establishing communication with the alternative destination display device and, when a predetermined event occurs on the mobile equipment, sending event information notifying the occurrence of the event to the alternative destination display device;

a camera information receiving part receiving moving image information indicating surroundings of the alternative destination display device;

an alternative display instruction determining part acquiring a parameter indicating whether or not the moving image information indicates the presence of a person and determining display specifics of a display on the alternative destination display device on the basis of the parameter; and an alternative display instruction sending part sending a display instruction including the display specifics to the alternative destination display device.

6. An information display system comprising a server, mobile equipment and display devices;

wherein the mobile equipment comprises:

an alternative display searching part acquiring current position information indicating a current position of the mobile equipment, sending an alternative display list request including the current position information to the server, receiving from the server an alternative display list representing a list of display devices located within a predetermined distance from the current position, selecting and determining a display device from among the display devices listed on the alternative display list on the basis of an inter-device distance between the mobile equipment and each of the display devices, the selected display device being a display device serving as an alternative destination display device;

an ME (Mobile equipment) short-distance radio communication part sending a distance measuring signal request signal to the display devices by short-distance radio communication, receiving a distance measuring signal sent from the display devices to measure a field strength of the distance measuring signal, and estimating the inter-device distance on the basis of the field strength;

an ME (Mobile equipment) network connection part establishing communication with the alternative destination display device and, when a predetermined event occurs on the mobile equipment, sending event information notifying the occurrence of the event to the alternative destination display device;

an alternative display instruction determining part acquiring a parameter indicating a status of the mobile equipment, a status of the alternative destination display device, or a status of the event that has occurred and determining, on the basis of the parameter, display specifics of a display on the alternative display; and an alternative display instruction sending part sending a display instruction including the display specifics to the alternative destination display device;

the server comprises:

an alternative display database storing information identifying the display device and an installation location of the display device;

an alternative display list request receiving part receiving the alternative display list request;

a list generating part selecting an alternative display list from the alternative display database on the basis of the current position information; and an alternative display list sending part sending the alternative display list; and the display device comprises;

an DP (Display) short-distance radio communication part receiving the distance measuring signal request signal and sending the distance measuring signal;

an DP (Display) network connection part establishing communication with the mobile equipment and receiving event information from the mobile equipment;

an alternative display instruction receiving part receiving the display instruction;

a screen control part generating display data concerning the event information on the basis of the display instruction; and a display part displaying the display data.

7. An information display system comprising a server, mobile equipment and a display device, wherein the mobile equipment comprises:

an alternative display searching part acquiring current position information indicating a current position of the mobile equipment, sending an alternative display list request including the current position information to the server, receiving from the server an alternative display list representing a list of display devices located within a predetermined distance from the current position, selecting and determining a display device from among the display devices listed on the alternative display list on the basis of an inter-device distance between the mobile equipment and each of the display devices, the selected display device being a display device serving as an alternative destination display device;

an ME (Mobile equipment) short-distance radio communication part sending a distance measuring signal request signal to the display devices by short-distance radio communication, receiving a distance measuring signal sent from the display devices to measure a field strength of the distance measuring signal, and estimating the inter-device distance on the basis of the field strength;

an ME (Mobile equipment) network connection part establishing communication with the alternative destination display device and, when a predetermined event occurs on the mobile equipment, sending event information notifying the occurrence of the event to the alternative destination display device;

a camera information receiving part receiving moving image information indicating surroundings of the alternative destination display device;

an alternative display instruction determining part acquiring a parameter indicating whether or not the moving image information indicates the presence of a person and determining display specifics of a display on the alternative destination display device on the basis of the parameter; and an alternative display instruction sending part sending a display instruction including the display specifics to the alternative destination display device;

the server comprises:

an alternative display database storing information identifying the display device and an installation location of the display device;

an alternative display list request receiving part receiving the alternative display list request;

a list generating part selecting an alternative display list from the alternative display database on the basis of the current position information; and an alternative display list sending part sending the alternative display list; and the display device comprises;

an DP (Display) short-distance radio communication part receiving the distance measuring signal request signal and sending the distance measuring signal;

an DP (Display) network connection part establishing communication with the mobile equipment and receiving event information from the mobile equipment;

a camera acquiring moving image information indicating surroundings of the display device;

a camera information sending part sending the moving image information to the mobile equipment when the display device is an alternative destination display device;

an alternative display instruction receiving part receiving the display instruction;

a screen control part generating display data concerning the event information on the basis of the display instruction; and a display part displaying the display data.

8. A non-transitory recording medium readable to mobile equipment and having recorded thereon a program for causing mobile equipment to function as the mobile equipment according to claim 1.

* * * * *